(12) United States Patent
Norin et al.

(10) Patent No.: US 10,433,022 B2
(45) Date of Patent: Oct. 1, 2019

(54) METHOD AND SYSTEM FOR PROVIDING NON-REAL-TIME CONTENT DISTRIBUTION SERVICES

(71) Applicant: KAROUSEL LLC, Alexandria, VA (US)

(72) Inventors: John L. Norin, Weston, FL (US); Boris Bogatin, Philadelphia, PA (US); John S. Leibovitz, Washington, DC (US); Kenneth Gould, Reston, VA (US); Monish Kundra, Washington, DC (US)

(73) Assignee: Siden, Inc. a Delaware C Corp, Alexandria, VA (US)

( * ) Notice: Subject to any disclaimer, the term of this patent is extended or adjusted under 35 U.S.C. 154(b) by 0 days.

(21) Appl. No.: 15/811,958

(22) Filed: Nov. 14, 2017

(65) Prior Publication Data

US 2018/0139508 A1    May 17, 2018

Related U.S. Application Data

(60) Provisional application No. 62/422,247, filed on Nov. 15, 2016.

(51) Int. Cl.
*H04N 21/43*   (2011.01)
*H04N 21/61*   (2011.01)
*H04N 7/20*    (2006.01)
*H04N 21/231*  (2011.01)
*H04N 21/433*  (2011.01)
*H04N 21/436*  (2011.01)
(Continued)

(52) U.S. Cl.
CPC ........... *H04N 21/6143* (2013.01); *H04N 7/20* (2013.01); *H04N 21/222* (2013.01); *H04N 21/231* (2013.01); *H04N 21/433* (2013.01); *H04N 21/436* (2013.01); *H04N 21/6112* (2013.01); *H04N 21/6131* (2013.01); *H04N 21/8126* (2013.01)

(58) Field of Classification Search
None
See application file for complete search history.

(56) References Cited

U.S. PATENT DOCUMENTS 9,456,247 B1 * 9/2016 Pontual ............ H04N 21/47202
2008/0244657 A1 10/2008 Arsenault

FOREIGN PATENT DOCUMENTS

WO    WO 03/058967    7/2003

OTHER PUBLICATIONS

Partial International Search Report for corresponding PCT/US2017/061760, dated Mar. 20, 2018, 13 pages.
(Continued)

*Primary Examiner* — Cai Y Chen
(74) *Attorney, Agent, or Firm* — Harness, Dickey and Pierce, P.L.C.

(57) ABSTRACT

A system and method for communicating content using remnant capacity includes an intermediate device having a content storage, a user device in communication with the intermediate device and a communication system provider communicating content to the intermediate device. The intermediate device stores the content the content storage. The user device requests content from the content storage. The intermediate device communicates content from the content storage to the user device in real time in response to requesting.

49 Claims, 30 Drawing Sheets

(51) Int. Cl.
*H04N 21/81* (2011.01)
*H04N 21/222* (2011.01)

(56) References Cited

OTHER PUBLICATIONS

Pixeom website; https://pixeom.com/; 10 pages.
Datami website; http://www.datami.com/; 9 pages.

* cited by examiner

METHOD AND SYSTEM FOR PROVIDING NON-REAL-TIME CONTENT DISTRIBUTION SERVICES

CROSS-REFERENCE TO RELATED APPLICATIONS

This application claims the benefit of U.S. Provisional Application No. 62/422,247, filed on Nov. 15, 2016. The entire disclosure of the above application is incorporated herein by reference.

TECHNICAL FIELD

The present disclosure relates generally to video distribution systems and, more specifically, to a method and system providing prepositioned content to users, where such prepositioning improves the overall availability of certain services and total performance of any wide area network.

BACKGROUND

The statements in this section merely provide background information related to the present disclosure and may not constitute prior art.

In many regions, internet service underperforms relative to the amount of content consumption that is desired. That is, many areas of the country and around the world do not have sufficient high-speed internet access. For example, dial-up, DSL, or satellite are examples of service that may not provide adequate speed or economical capacity to support the downloading of high quality of video content or other large forms of data in a timely or economic manner. Over-the-top (OTT) video services are becoming increasingly commonplace in the United States market and elsewhere. OTT service provides an attractive alternative to traditional cable bundles. However, many consumers in rural areas do not have sufficient broadband connectivity to support viable over-the-top or data intensive service. Providing a cost competitive alternative to OTT video and data delivery for rural customers is desirable.

A large number of people are dropping traditional cable television service in favor or over-the-top services. This contributes to the volume of data used to watch videos. Nearly half of the approximately 125,000,000 households in the United States now subscribe to at least one video streaming service. By one estimate, the amount of traffic attributable to the most popular video services such as Netflix®, Amazon Prime Video® and iTunes® together account for more than 40% of all peak internet traffic in the U.S. Another 18% is attributable to YouTube®. Ultra-high definition (UHD) content is also beginning to appear on the market. Thus, the increase in internet traffic is expected to grow for the foreseeable future. For Netflix® service, a 5 Mbps is recommended for HD content. However, for ultra-high definition content, a 25 Mbps connection is recommended. Ultra-high definition streams may consume up to 7 GByte per hour.

Rural Americans have limited ability to access on-demand video content because of the lack of infrastructure. Mobile subscribers also find that their service cannot affordably support video streaming to a television. Customers who rely on over-the-top entertainment use expensive fixed broadband services due to the high volume of data required by and provided to the consumer's device.

Many consumers living in rural areas have few options for watching over-the-top television. Up to 34,000,000 Americans lack access to 25 Mbps service. Two-thirds of those live in rural areas. 20,000,000 Americans lack access to even 10 Mbps service. Satellite and long-loop DSL connections are typically unsuitable for supporting large amounts of video content.

A trend in lower income households is using the mobile device as a means to access video data. However, using a mobile device to access video data is limited by data caps provided by each of the service providers. Because of the high data intensity of a video service, data caps can be easily surpassed. That is, only a few HD movies may cause a family to exceed its mobile broadband data cap.

Other data services are also highly intensive in the use of data. For example, software updates and internet of things (IoT) devices may also consume a large amount of data that are also desired by underserved users.

SUMMARY

The present disclosure provides a method for delivering content to user devices through an intermediate device that is pre-populated with content using low cost capacity, under-used capacity or remnant capacity of a communication network.

In one aspect of the disclosure, a system for communicating content includes an intermediate device having a content storage, a user device in communication with the intermediate device and a communication system provider communicating content to the intermediate device through a communication system. The intermediate device stores the content in content storage. The user device requests content from the content storage, at some other point in time. The intermediate device communicates content from the content storage to the user device in real time in response to the request, using some other communication system. The disclosed system may use remnant capacity of any communication system, that is not otherwise being used to serve content requests from user devices directly or to communicate content to users for direct, live consumption in both cases without the use of an intermediate device to receive content through a communication system, store the content in content storage, and communicate the content from the content storage to the user device at some other point in time using some other communication system. The amount of content that is communicated using the present system for "pre-positioning" content is based on optimizing the overall capacity, throughput, QoS, and cost associated with delivering such content to the user devices using a combination of the pre-positioning and "in response to requests" and "for direct, live consumption" systems.

In a further aspect of the disclosure, a method comprise communicating content from a communication system provider to an intermediate device comprising a content storage through a communication system, or any capacity that is not otherwise being used to serve content requests from user devices, storing the content in the content storage of the intermediate device, thereafter, requesting, by a user device, content from the content storage, and communicating content from the content storage of the intermediate device to the user device in real time in response to requesting.

In another aspect of the disclosure, a method comprises communicating data to a router of a local area network using a first communication system in real-time at a first speed, communicating the data from the router to a user device through the local area network, communicating content in non-real-time through a second communication system to an intermediate device comprising content storage using remnant capacity at a second speed greater than the first speed, storing the content in the content storage of the intermediate device, thereafter, requesting, by the user device, content stored in the content storage through the local area network and communicating content from the content storage of the intermediate device to the user device in real time through the local area network in response to requesting.

The disclosed method may use remnant capacity of any communication system, that is not otherwise being used to serve content requests from user devices directly or to communicate content to users for direct, live consumption in both cases without the use of an intermediate device to receive content through a communication system, store the content in content storage, and communicate the content from the content storage to the user device at some other point in time using some other communication system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
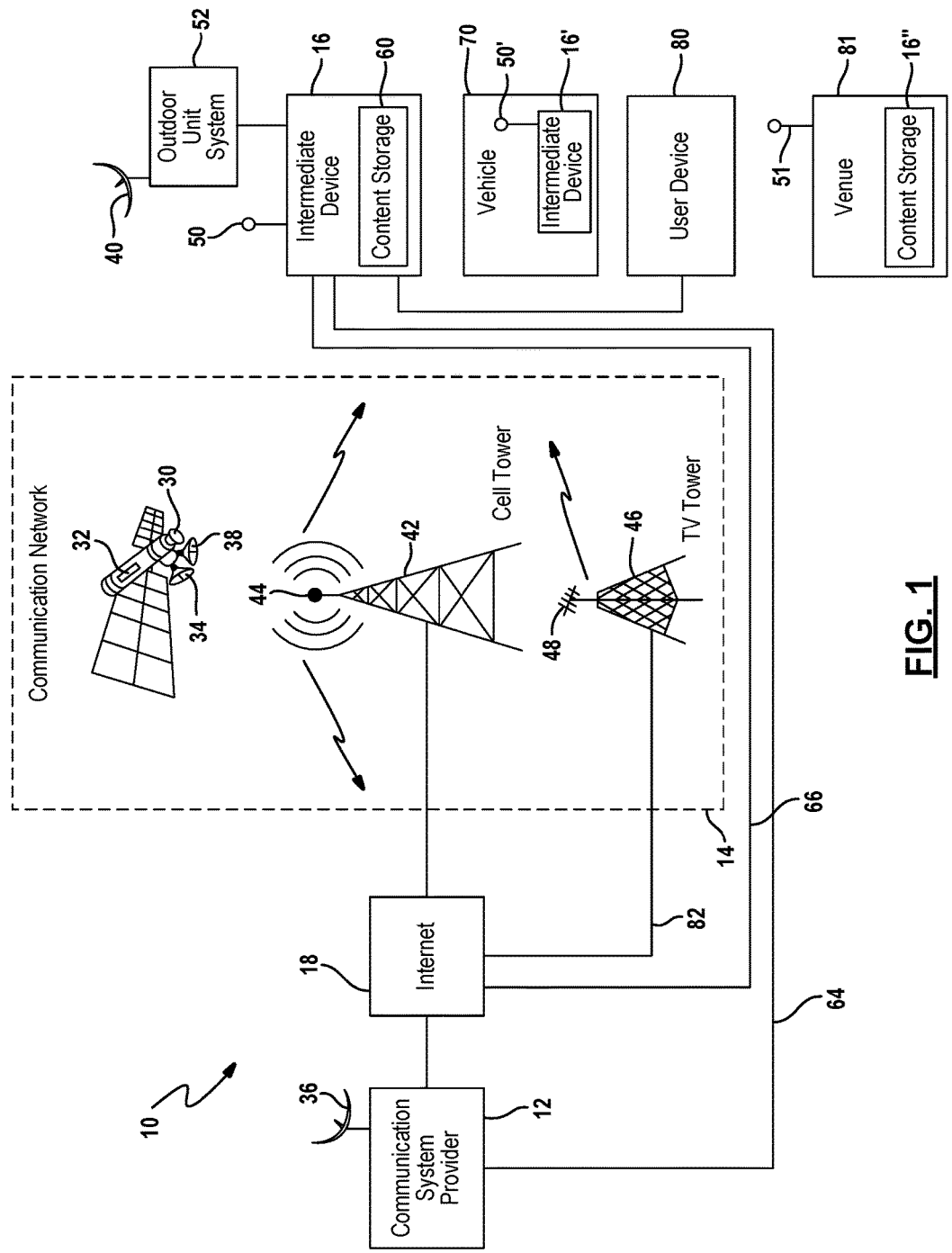
FIG. 1 is a high level block diagrammatic view of a first example of a communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that performs instructions to carry out the steps performed by the various system components. A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, software, software updates, IoT data, weather, application, application data, "best of web" content, e-delivery of materials. etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein.

While the following disclosure is made with specific broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular or mobile distribution systems, power-line broadcast systems, any point-to-point and/or multicast Internet Protocol (IP) delivery network, and fiber optic networks. Further, the different functions collectively allocated among a service provider and intermediate devices as described below can be reallocated as desired without departing from the intended scope of the present disclosure.

User devices may be coupled to the Internet through a constrained network or not even coupled to the Internet at all. In a constrained network, the speed or available resources may not be sufficient to provide a quality level of service. In the present examples remnant capacity in a second less constrained network than the constrained network may be used to pre-position content at an intermediate device. The prepositioned content may then be provided from intermediate device storage directly or through a local network when demanded at the user device without having to rely on an external constrained network.

Remnant capacity is a resource or a plurality of resources that are not being used for transmitting data or content by a content system provider during regular customer use. Regular use of a communication network for primary customers may be referred to as a primary use. Remnant capacity may be referred to as a secondary use and may be governed between agreements between a content provider and a communication system provider. The content provider may wish to provide a service to users using the remnant capacity. Users may not be aware of the path the content traverses. Remnant capacity may also include resources that have a lower priority that can be allocated to another use. In the simplest sense, remnant capacity is a data path or bandwidth that is increasingly left unutilized during non-peak times of network use. Inversely, there is limited remnant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long term evolution wireless network (LTE) system, remnant capacity may be the bandwidth not being used for voice or data content requested from users in real time. In a satellite system, the remnant capacity is the bandwidth not being used for broadcasting of content to users for the sake of real-time consumption of such content or for voice or data content requested from users in real time. There is a very limited incremental cost for utilizing this remnant capacity, or the unused or under-used resources of a communication provider's network, as that cost is already being borne for the provision of regular customer use services, and as such offers means for highly cost effective content distribution. By utilizing the remnant capacity that would otherwise be wasted, the present system allows communication system providers to use it to offer other services to customers or to sell the capacity to others.

The remnant capacity may be used in various ways by intercommunication of the intermediate devices, the communication system provider, and the content service provider. Queries as to the current availability of capacity, the upcoming availability of capacity and the prioritization of content to be communicated using the remnant capacity may be formed. Quality of service (QoS) prioritization using eMBMS quality class identifiers may be performed. Delivery of content using remnant capacity may be queue-driven. All of the content to be delivered may be placed into the queue with attributed priority levels and then served from the queue automatically upon remnant capacity availability, coordinating which priorities are served in which sequence per what rule.

All of the content to be delivered may be placed into the queue with attributed priority levels and then served from the queue automatically upon remnant capacity availability, coordinating which priorities are served in which sequence per what rule.

Content may also be retransmitted using remnant capacity. User preferences (queuing), missing content (error correction), content most popular for that user and remainder of content may all be used in prioritizing within queues.

The present system provides a high-capacity broadcast delivery system for pre-positioning content, that combines the strategic use of excess capacity or remnant capacity in a content communication network with pre-positioning content close to the users by caching and storage of such content at local content stores, to allow users to access a large amount of content such as over-the-top (OTT) content, software updates, or other highly intensive data applications without needing to traverse the content communication network at the time the content is desired. As will be further described below, the system may use remnant capacity of different types of communication systems including but not limited to mobile or cellular systems such as an LTE system, a satellite system or a digital television system. Content such as video content may be provided to an intermediate device which stores the content therein. When users request content, the content may be provided from the stored or cached content store, rather than requiring that content to be served by the content communication network in response to users' requests from a remote location at a low speed while further burdening the content communication network. A wide variety of video programming including movies, television, shows, documentaries and news may be provided based upon user preferences. Also, other types of video programming such as instant replays may also be provided to users. The system may also be used to provide software and application updates for various types of users that are coupled to the intermediate device. The system may also be used for defense purposes or purposes in which high amounts of data are required, but whereas such data may be pre-positioned at the local content store by the content communication network and not be required to be delivered from the source of such data on a live or real-time basis.

The system is particularly suitable for rural customers, customers in markets with lower speed, lower capacity networks, or customers of companies that want to utilize their lower speed networks to offer an equivalent of high speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high speed cable and fiber networks, or any of the aforementioned networks, to be alleviated by combining content delivery through pre-positioning and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of remnant capacity for pre-positioning of content and subsequent use from local content stores, and peak or regular capacity for serving users' real-time/live voice and data requests. If content that is likely to be downloaded to the user is pre-positioned at the local content store, or the intermediate device, and then served from the intermediate device, the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, remnant capacity approach with a real-time voice and data request, peak or regular capacity approaches, lower speed broadband service providers may compete head-to-head with established cable or fiber providers while any of the aforementioned networks improve their performance by leveraging such a combination of approaches.

Referring now to FIG. 1, a high level block diagrammatic view of a communication system 10 is set forth. In this example, a communication system provider 12 is a system that is in communication with a communication network 14 and controls the operation of the communication network 14. The communication network 14 is in communication with an intermediate device such as an intermediate device 16. The communication system provider 12 is used for controlling the communication network 14. The communication network 14 may be in direct connection with the communication provider or to the internet 18. The communication system provider 12 controls the schedule and placement of content through the communication network 14. The communication system provider 12 may receive content from various sources as will be described further below.

The communication network 14 is in communication with the internet 18. The communication network 14 may be a single stand-alone network or may be a combination of networks. That is, the remnant capacity of one or more networks may deliver content to the intermediate device 16. The communication network 14 may be wireless. The communication network 14 for communicating content to the intermediate device 16 may include a satellite 30 that has one or more transponders 32 therein for receiving and communicating content therefrom. The satellite 30 may also include a receiving antenna 34 that is in communication with an antenna 36 of the communication system provider. A transmitting antenna 38 communicates content to an antenna 40 of the intermediate device 16. The antennas 34, 36, 38 may represent multiple antennas or multiples types of antennas.

The communication network 14 may also include a cell tower 42, or any other wireless transmission device, having an antenna 44 (or antennas) thereon. The antenna 44 may represent a cellular antenna, a WiFi antenna, or any other wireless transmission antenna of the cell tower 42 and may communicate content wirelessly to the intermediate device 16 through the antenna 44, from the communication system provider 12, including also wirelessly through the antenna 44.

The communication network 14 may also include a television tower 46 having an antenna 48 thereon. The TV tower 46 may communicate content to the intermediate device 16 from the communication system provider 12.

In all communication system cases, the communication network 14 may communicate using remnant capacity as will be further described below. The remnant capacity may include various types of resources, that are not being used for serving users' real-time/live voice and data requests and their real-time/live voice and data consumption, and that are more ideally used for pre-positioning of content to the intermediate device 16. As mentioned above, the communication network 14 may effectively distribute (pre-position) content on a non-real-time basis to the intermediate device 16, for subsequent consumption by users directly from the intermediate device 16 instead of from the communication network 14.

The communication network 14 may communicate with the local area network 310, which would in turn communicate the content to the intermediate device 16, or the intermediate device 16 directly, using various types of access systems so that a maximum amount of content may be provided to the various intermediate devices. For example, the communication network 14 may use frequency division multiple access, timed division multiple access, spatial division multiple access, code division multiple access and orthogonal frequency division multiple access. Depending upon the requirements of the system and the types of systems provided, different types of access protocols may be used.

The intermediate device 16 may also have an antenna 50 disposed thereon. The antenna 50 may communicate with the antenna 44 and the antenna 48 of the communication network 14. By making the intermediate device portable the antenna 50 may be placed in a position of high reception. The intermediate device 16 may act as a small cell.

An antenna 40 of an outdoor unit system 52 may be used to communicate with the antenna 38 of the satellite 30. The antenna 40 may be a flat faced phased-array antenna. Details of the outdoor unit system 52 and the intermediate device 16 are provided below.

The intermediate device 16 may also include a content storage 60. The content storage 60 may include a solid state content storage, a hard disk drive or a combination of both. The content storage 60 may be designed to hold a substantive amount of data on the order of multiple terabytes or greater. The content storage 60 is used to store pre-positioned content received through either the antenna 40 or the antenna 50. The intermediate device 16 may also be in communication with a back haul network 64. The back haul network 64 may be part of the communication network which, as demonstrated, is presented as wireless systems. The back haul network 64 may be a wireless network as well.

The system 10 may be suitable for prepositioning content using a wired network 66 as well. That is, the intermediate device 16 may also be coupled to the Internet 18 through the wired network 66. Content may be prepositioned using the remnant capacity of the wired network 66 as will be described below. The wired networks may be a DSL network, a cable network, or a fiber network.

The communication network 14 may also be in communication with a vehicle 70. The vehicle 70 may include an intermediate device 16' configured in the same manner as that of the intermediate device 16. The vehicle 70 may include various types of vehicles including an automobile, a ship, a bus, a train, an airplane or the like. The intermediate device 16' is coupled to one or more antennas 50' that may be located on the exterior of the vehicle. Of course, the antennas 50' may be located within the vehicle 70 at the intermediate device 16'. A user device 80 is in communication with the intermediate device 16. For convenience, a line representing either a wireless or wired connection is presented between the user device 80 and the intermediate device 16. The user device 80 requests content from the intermediate device 16 and, more particularly, from the content storage 60 of the intermediate device 16. A venue 81 such as a stadium, office building, hotel or multiple dwelling unit may have an intermediate device 16" with an exterior antenna 51 in communication with the satellite antenna 38, the antenna 42 of the cell tower 42 and/or the antenna 48 of the TV tower.

The cell tower 42 may use LTE technology or other cellular technology. In particular, the cell tower 42 may use LTE-B technology to communicate with the intermediate device 16. A wired connection 82 may be disposed between the communication network 14 and the internet 18 and/or communication system provider 12. As will be described below, the intermediate device 16 may be part of the cell tower 42 and thus the antenna 44 may act as a WiFi or WiMax antenna for communicating with the user devices.

The connection between the communication network 14 and the internet 18 or the communication system provider 12 may also include remnant capacity. This remnant capacity may be utilized by the system in a similar way as the aforedescribed remnant capacity, to distribute pre-positioned content to the communication network 14 or to the internet 18, for their in-turn distribution of such pre-positioned content, including using remnant capacity, to ultimately reach the intermediate device 16.

Figure 2:
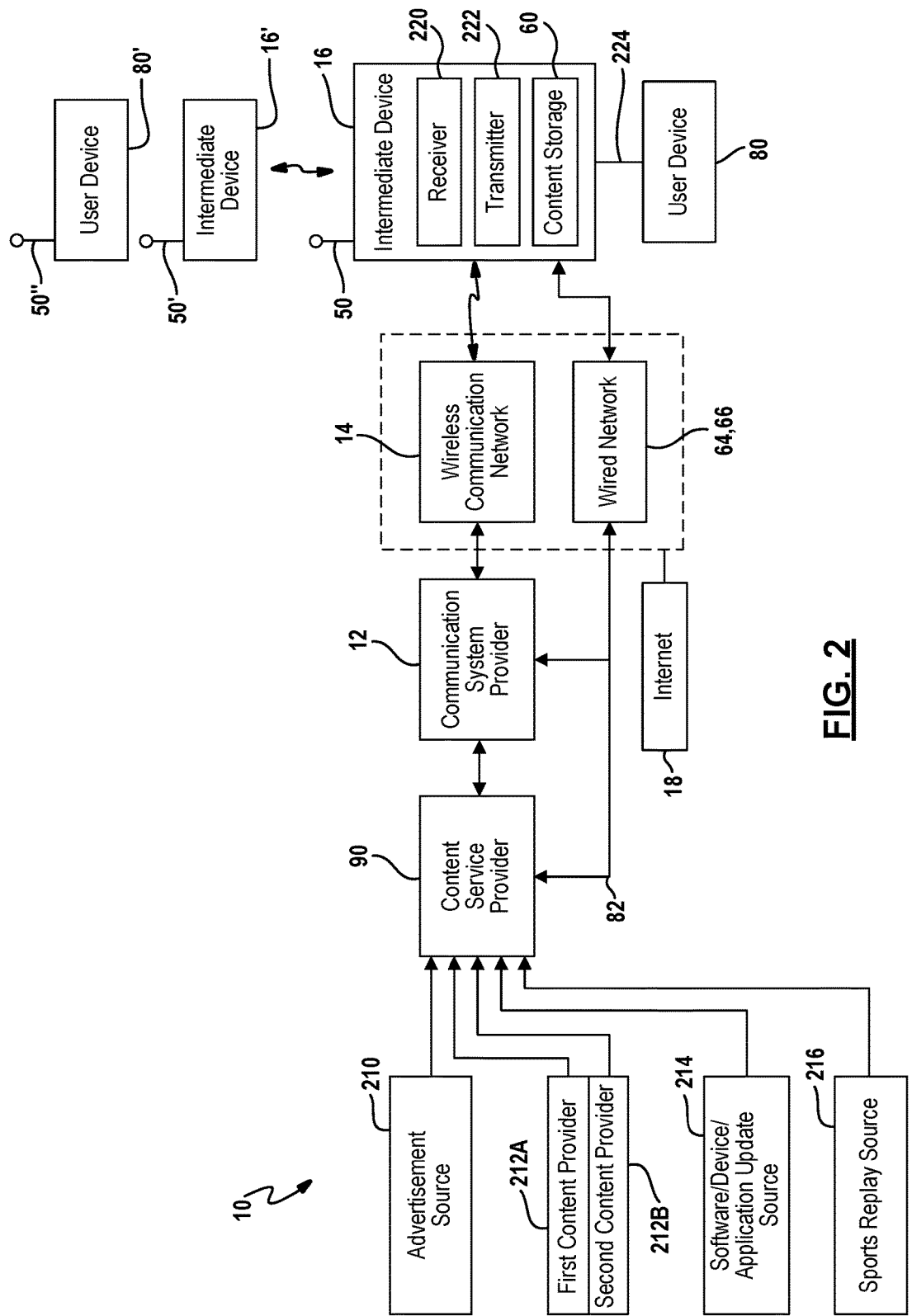
FIG. 2 is a block diagrammatic view of a more detailed communication system of FIG. 1.

Referring now to FIG. 2, the communication system provider 12 is shown in communication with a content service provider 90. The content service provider 90 is a system that is used for providing content to the communication system provider 12. The content service provider 90 and the communication system provider 12 may be business entities. The content service provider 90 may purchase the remnant capacity of the communication system provider 12. The content service provider 90 may be a service provider that is subscribed to by the users of the user device 80. However, the content service provider 90 may include pre-existing services such as mobile phone service providers, cable providers and the like. The content service provider 90 communicates various instructions to the communication system provider 12 so that the content is distributed using the remnant capacity of the communication system provider 12. Details of the intercommunication between these systems are described in further detail below.

The content service provider 90 may receive content from various sources including an advertisement source 210, a first content provider 212A, a second content provider 212B, a software/device/application update source 214 and a sport replay source 216. The advertisement source 210 may communicate advertisements to the content service provider 90. The advertisements may include video, audio and metadata associated therewith. The metadata associated with an advertisement may include desired targets or which users would find the content desirable and a product definition.

The content providers 212A and 212B may also provide video and audio content as well as metadata for the content. The metadata may include the content title, actors or actresses, and various other identifying data including various categories such as genres and the like. The content may be requested from the content providers or indicated to be pre-positioned at the intermediate devices by the content providers.

The software/device/application update source 214 may provide new software, software updates, device updates and application updates to the intermediate device 16 through the content service provider 90 and the communication system provider 12, intended for the user device. The updates may be incremental changes to software resident in a user device, whereas the new software may be software not currently within the user device or intermediate device 16. The software and updates may be requested by a device for non-real-time delivery or delivered through no action of the device and pre-positioned at the intermediate device based on the identity of the user device, the software or the applications residing thereon.

The sports replay source 216 may provide sports replays to the content service provider 90 for distribution to the intermediate device 16. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

The metadata included with the various types of content described above allows the content to be distributed to the proper intermediate device or intermediate devices on the right schedule while accommodating any other content distribution priorities while using the remnant capacity of the communication network under the control of the communication system provider 12.

The intermediate device 16 is illustrated having content storage 60 and also a receiver 220. The receiver 220 may be used to receive communications from the wireless communication network 14. A transmitter 222 may be used to transmit wirelessly or by wire to and from the wireless communication network 14, the wired network 64 and/or the wired network 66.

The user device 80 is illustrated having a direct or wired connection 224 with the intermediate device 16. The intermediate device 16 may thus be a dongle or other type of directly connected device to the user device 80. The wired connection 224 may be an HDMI or USB connection.

More than one intermediate device may be disposed in a system. The intermediate device 16 may also communicate with a second intermediate device 16'. The intermediate device 16' may be configured in the same manner as that of the intermediate device 16. The intermediate device 16 may communicate from the antenna 50 to the antenna 50' of the intermediate device 16'. The intermediate devices 16, 16' may form a peer-to-peer network which is described in more detail below. Of course, more than two intermediate devices may form a peer-to-peer network. The peer-to-peer network may communicate various types of content therebetween. That is, if one intermediate device misses a portion of a content transmitted from the wireless communication network 14, another intermediate device may be queried to determine whether the intermediate device includes the missing content. The missing content may thus be communicated in a peer-to-peer basis between the antennas 50 and 50'. The wireless communication network 14 may also distribute various portions of the content which are then communicated to various other intermediate devices in an intentional way rather than a "missing" way. If content is desired by the user of one intermediate device but is not available at that intermediate device, the intermediate device for the intentional request may request the content from another intermediate device within the peer-to-peer network. Further, some such intermediate devices 16' may be configured to not have an ability to receive content from wireless communication network 14, and be only able to communicate with other intermediate devices 16 and 16' to receive such "intentional" or "missing" content.

The intermediate device 16' may be in communication with a user device 80'. The user device 80' may be in communication with the intermediate device 16' through the antenna 50". The user device 80' may be configured in a similar manner to that set forth at the user device 80' but may be a wireless device rather than a wired connection as is illustrated with respect to the user device 80.

Figure 3:
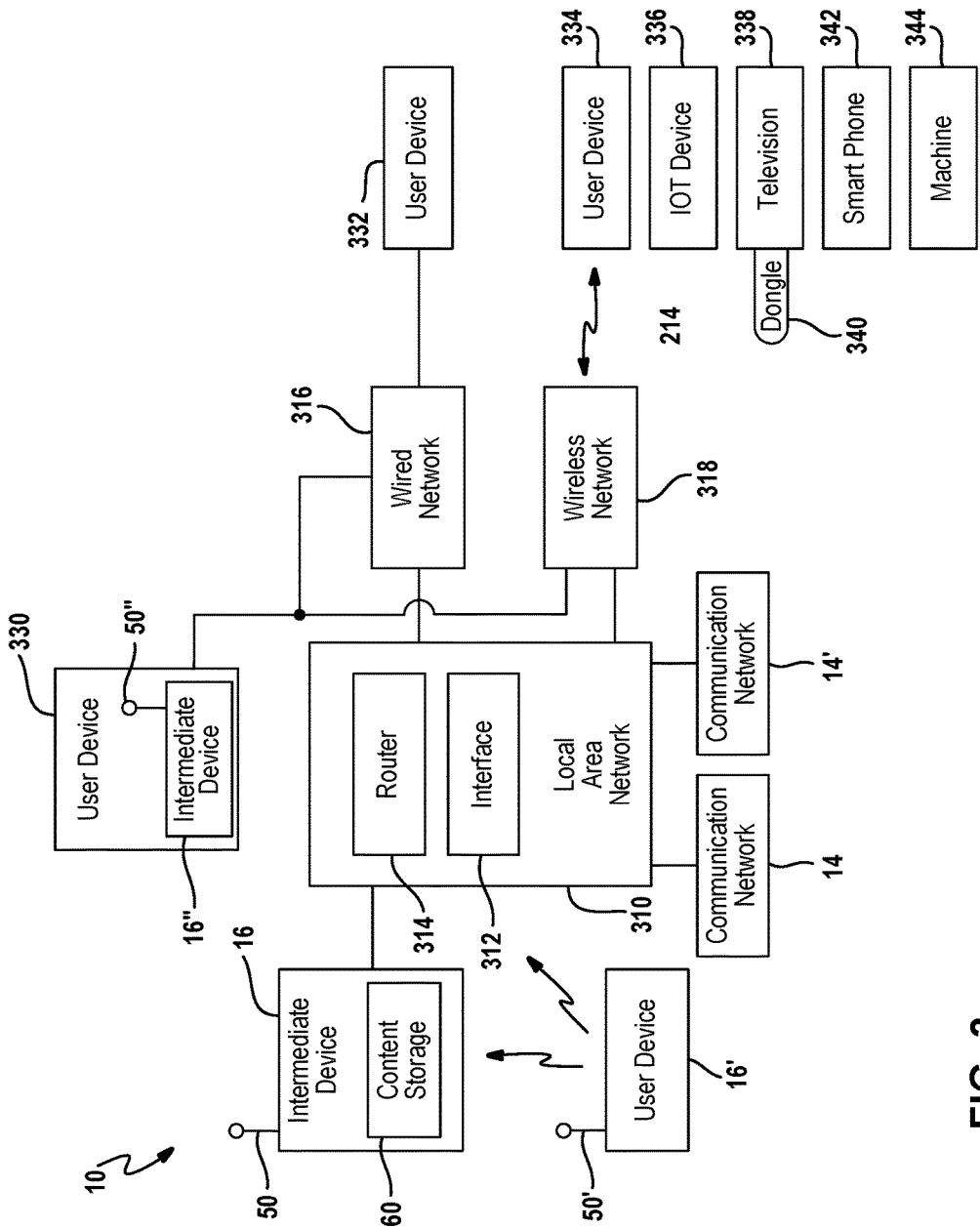
FIG. 3 is a block diagrammatic view of a plurality of user devices in a local area network.

Referring now to FIG. 3, the communication system provider 12 may be in communication with a local area network 310 through the communication network 14 as described above. Only the communication network 14 is illustrated for simplicity. FIGS. 1 and 2 do not illustrate the local area network 310. The local area network 310 may have an interface 312 for communicating with the communication network 14. The interface 312 may be a modem.

The local area network 310 may also be coupled to a second communication network 14'. The second network 14' may be the primary two way connection to the Internet for the user devices 332-344. The second network 14' may represent dial-up or a digital subscriber line. As described in the examples set forth herein, the system 10 may be used to preposition content in the intermediate device 16. The supplementation of content is particularly useful when the second communication network 14' for providing regular internet service to user devices 332-344 is slower than the speed of the communication network 14, although not necessarily. It is possible that the local area network 310 may not have a two way connection to the internet except the prepositioned content received through the communication system.

The local area network 310 may also include a router 314. The router 314 may be used for connecting the intermediate devices with user devices within the local area network 310. The local area network may provide both a wired network 316 and a wireless network 318. Various devices may take advantage of each method of communicating.

The local area network 310 is in communication with one or more intermediate devices 16 as described above. The local area network 310 may also include an intermediate device 16, along with an interface 312, and a router 314. The local area network 310 may also include a user device 332, along with an intermediate device 16, interface 312, and a router 314. The intermediate device 16 includes the content storage 60 and the antenna 50 as described in FIGS. 1 and 2. The intermediate device 16' is in communication with the local area network 310 and may exchange content or other signals with the intermediate device 16 through the local area network 310. An intermediate device 16" may also be located within a user device 330. The user device 330 or the intermediate device 16" therein may include an antenna 50"' for communicating with the local area network 310. The intermediate device 16" may receive content using the remnant capacity of the communication network 14. The user device 330 may be one of a variety of types of devices including a video game console, a cellular phone, a set top box or the like.

The user device 330 may be coupled to the local area network 310 through either the wired network 316 or the wireless network 318.

A user device 332 may be coupled to the local area network 310 through a wired network 316. The user device 334 may be coupled to the local area network 310 through a wireless network 318. As mentioned above, the user devices 332, 334 may be various types of user devices including a cellular phone or smartphone, a tablet, a laptop, a TV or the like.

An internet of things (IoT) device 336 may be coupled to the local area network 310 through the wireless or wired networks 316, 318. The IoT devices 336 may require software and application updates suitably delivered via remnant capacity.

A television 338 may also be coupled to the local area network 310 through the wired network 316 or the wireless network 318. The television 338 may be a smart television for directly coupling to the wired network 316 or the wireless network 318. However, the television 338 may also require a dongle 340 that is used for communication with the wireless network 318. The dongle 340 may have an application therein for providing the television 338 with a graphical user interface. The dongle 340 may also include a content storage for storing content therein. The dongle 340 may also act as an intermediate device for receiving and storing content.

A smartphone 342 may also be in communication with the wired network 316 and the wireless network 318 so that access to the local area network 310 may be obtained.

A machine 344 may also be in communication with the local area network 310 through the wired network 316 or the wireless network 318.

All of the user devices 330-344 may be in communication with the wireless network 318 using many different types of standards including Bluetooth and Wi-Fi. Each of the user devices 330-344 may receive content through the local area network 310 from at least one of the intermediate devices 16, 16' and 16". The application for retrieving and serving content to the user devices 330-344 may be in the devices 330-344, in the intermediate device 16, in the local area network 310, in the router 314 or in the interface 312.

The types of content may include audio content, video content, operating system updates, other software updates, applications, weather information, "best of web" content and e-delivery of various materials. The users of the user devices 330-344 may each obtain the various types of content from the content storage 60 of the intermediate device 16. The content may be obtained individually or simultaneously from the content storage 60. As will be described below, the user devices 330-344 may provide an inventory list or a list of desired content that is communicated through the local area network 310 and ultimately back to the communication system provider 12 of content service provider 90 illustrated in FIGS. 1 and 2. The communication back may be performed with either the communication network 14 or 14'.

Figure 4:
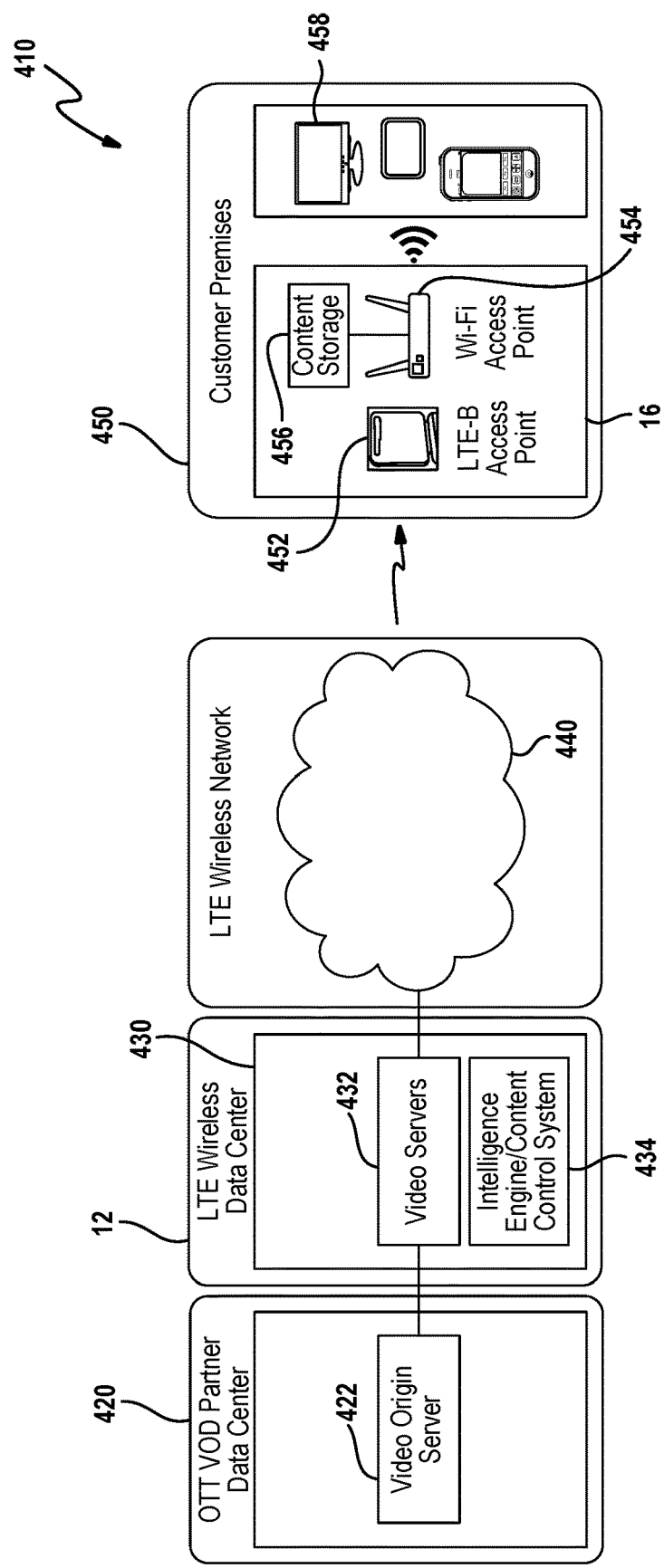
FIG. 4 is a high level block diagrammatic view of a communication system using an LTE wireless network.

Referring now to FIG. 4, an LTE content delivery system 410 is illustrated. In this example, the communication modules are specifically directed to an LTE system that provides an over-the-top video system. However, other cellular phone systems may be used. An over-the-top video on-demand partner data center 420 acts as the content service provider 90 and has a video origin server 422 disposed therein. The video origin server 422 receives video content from various sources including the sources set forth in FIG. 2. The partner data center 420 is in communication with the communication system provider 12. In this case, the communication system provider 12 is an LTE wireless data center 430. The LTE wireless data center 430 includes video servers 432 that are in communication with the video origin server 422. The wireless data center 430 is also in communication with an intelligence engine/content control system 434. The intelligence engine/content control system 434 may be used for various functions as will be described in detail below. The intelligence engine/content control system 434 may, in general, be used for identifying remnant capacity, including that of LTE wireless network 440, and scheduling the delivery of content to the intermediate devices, including using LTE wireless network 440. The intelligence engine/content control system 434 may also be responsible for managing the content at the intermediate devices by removing the content when necessary. The intelligence engine/content control system 434 may also be responsible for calculating the optimal amount of content, the frequency of such content re-distribution, and the relative timing of different content to be distributed by the LTE wireless network 440 and to be distributed to any intermediate device 16.

The video servers 432 of the wireless data center 430 is in communication with an LTE wireless network 440. The LTE wireless network 440 is in communication with a customer premises 450. The customer premises 450 may include an intermediate device 16. The intermediate device 16 may include an LTE-B access point 452 used for accessing the content at the wireless network 440. The access point 452 may also be used for receiving instructions for tuning to the wireless network 440. Specific instruction signals may be provided for tuning to content at specific times. Channels, frequencies and times may all be communicated in the instruction signals.

The intermediate device 16 may also include a Wi-Fi access point 454 and a content storage 456. The Wi-Fi access point 454 may establish a Wi-Fi network with the various user devices 458 within the system. The Wi-Fi access point may be referred to as a router. The content storage 456 may be used to store the content received through the LTE-B access point 452. Of course, other wireless technologies may be accessed by the wireless access point. Each of the user devices 458 may include an application for accessing the content within the content storage 456. The application may also be received through the access point 452 or it may be pre-stored within the content storage 456 when a user purchases the system. The application may also be pre-stored within the user devices 458.

Figure 5:
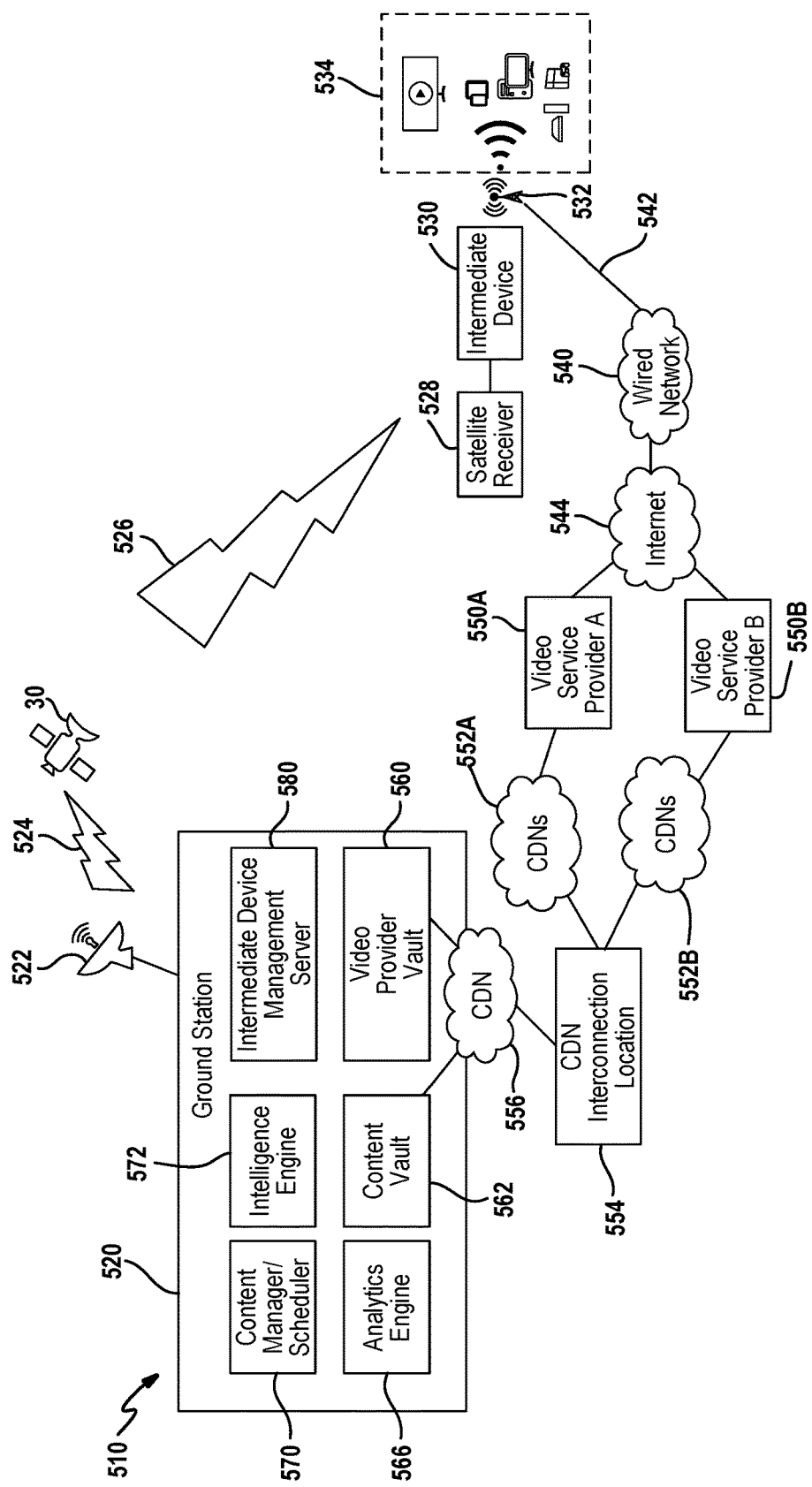
FIG. 5 is a block diagrammatic view of a remnant capacity communication system using a satellite.

Referring now to FIG. 5, a content provider system 510 based upon the satellite 30 is set forth. In this example, a ground station 520 communicates content to a transmitting antenna 522. The transmitting antenna 522 communicates content to the satellite 30 through an uplink 524. A downlink 526 communicates content to a satellite receiver 528 located at the customer premises or other user. The downlink 526 may be formed from signals from one or more transponders of the satellite 30. Multiple paths or beams may communicate to an intermediate device 530 or multiple intermediate devices. Of course, a single wide beam such as a continental United States beam (ConUS) may be used as well. The intermediate device 530 is in communication with the satellite receiver 528. The satellite receiver 528 may also be disposed within the intermediate device 530. The intermediate device 530 communicates content through a wireless network 532 to the user devices 534. The content from the ground station may be communicated using remnant capacity from resources that are not fully used at any predetermined time. The intermediate device communicates with a network 540 to provide a return link 542. The network 540 may be a cellular network or a wired network. The network 540 may be in communication with the internet 544 which provides data to a first video service provider 550A or a second video service provider 550B. Various analytic data, content lists, preferences and the like may be communicated from the intermediate device 530 to the video service providers 550A, 550B.

The video service provider 550A may be in communication with a content distribution network 552A. The video service provider 550B may be in communication with a content delivery network 552B. The content delivery networks 552A, 552B may correspond to a business partner of the service. The content delivery networks 552A, 552B may communicate content to a content delivery network interconnection location 554 where the content is then communicated to a communication system provider content delivery network 556. The content delivery network 556 communicates content to the ground station 520 which may be part of the communication system provider 12. A video provider vault 560 may receive the content from the content delivery network 556. A second vault 562 may also receive content from the content delivery network. The vault 562 may store different types of content than that of the video provider vault 560. As mentioned above, the system may provide different types of data to the intermediate devices including software, video replaced, original video content, audio content and the like.

An analytics engine 566 is disposed within the ground station 520. The analytics engine 566 may receive feedback from the plurality of intermediate devices 530 disposed in the system. The analytic servers interpret the feedback from the intermediate devices for various aspects including usage trending, troubleshooting, preferences, demographics, behavioral data for advertising, pricing, intelligence engine performance and other analytic functions.

The vaults 560, 562 provide protected storage of video and metadata based upon content partner needs and various agreements.

A content manager/scheduler (CMS) 570 may be incorporated within the ground station 520. The content manager/scheduler 570 manages the schedule by which all content and commands are sent to the intermediate device including receiving content prioritization information from an intelligence engine 572 and creates the appropriate schedule for the broadcasting content, receiving intermediate device control messages from the intermediate device, management server and creating an appropriate schedule for broadcasting messages, instructing the servers to pull content from the content vault 562 and broadcasting the content according to the schedule. The CMS 570 may also generate commands for the intermediate device, instructing the intermediate devices to use specific tuners at specific times. The content manager/scheduler 570 also determines the remnant capacity based upon the content being broadcast through the system and forecasted content. The content manager/scheduler 570 enables the broadcasting of the content using the remnant capacity.

The intelligence engine 572 receives information from the various content partners determines the content available to be distributed and that the content is available to be distributed at the vaults 560, 562. The intelligence engine 572 also may schedule the removal of content previously delivered to the intermediate devices for removal. The intelligence engine 572 may also monitor the intermediate devices and the amount of content storage available on each intermediate device. Different partners may be associated with the ground station 520. That is, the data may be retrieved from the intermediate devices on a partner-by-partner basis so that the content may be scheduled accordingly. The intelligence engine 572 may also specify the times and the periodicity for broadcasting and rebroadcasting content. As will be described below, the carousel used for broadcasting the content using the satellite may be regulated using the intelligence engine 572. The ground station 520 includes an intermediate device management server 580. The intermediate device management server is responsible for the management of the intermediate devices at the customer premises. The intermediate devices generate secured management messages for the intermediate devices and monitor the utilization and health of the intermediate devices. The allocation of storage may be managed by the intermediate device management server based upon various partner agreements. The intermediate device management server 580 also manages the remote configuration, authentication and troubleshooting for the intermediate devices.

Figure 6:
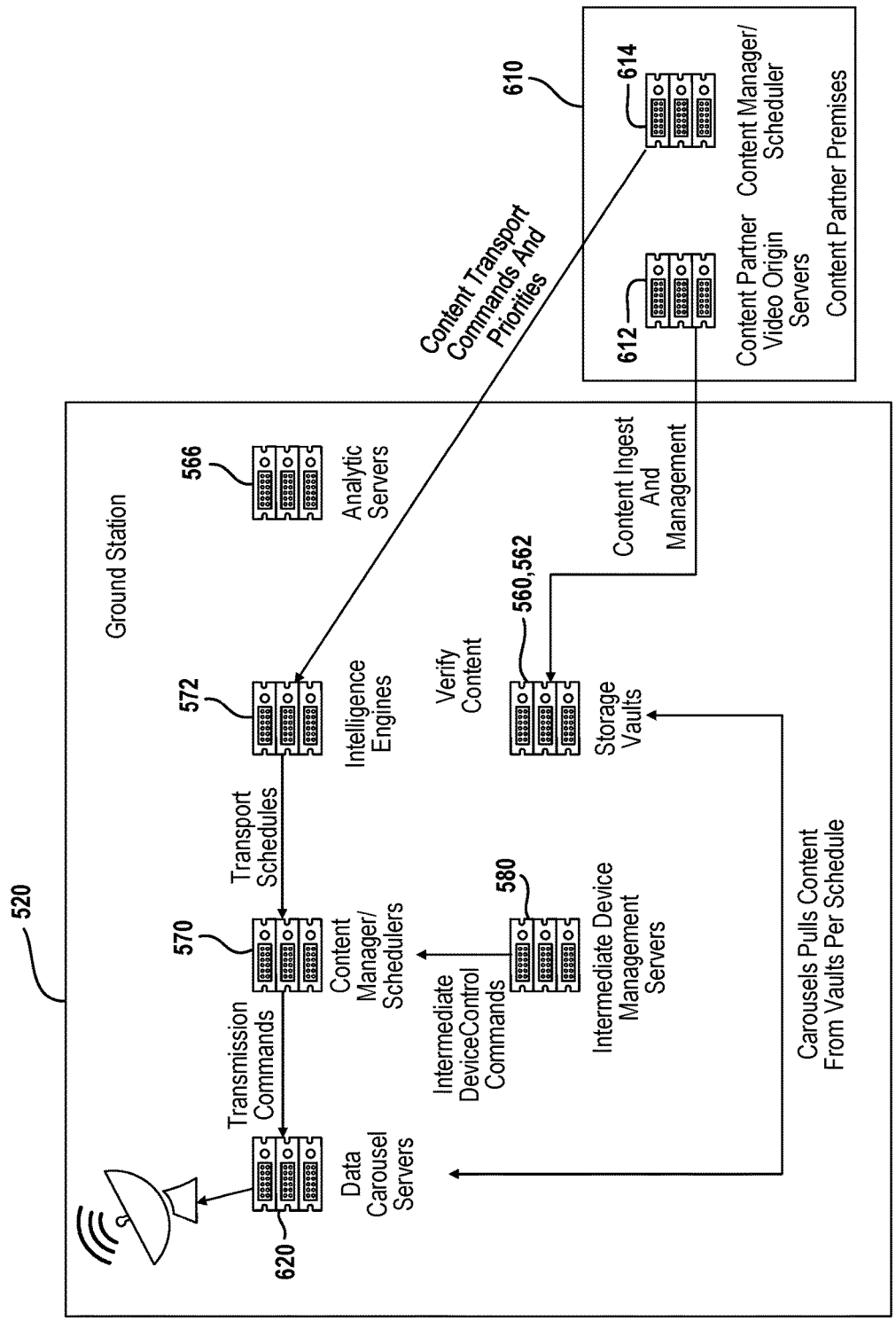
FIG. 6 is a block diagrammatic view of a satellite ground station used in FIG. 5.

Referring now to FIG. 6, a ground station 520 similar to that set forth in FIG. 5 is set forth with the same reference numerals. The ground station 520 may be in communication with a content partner premises 610. The content partner premises 610 may include the content partner video origin server 612 and a content manager/scheduler 614.

Figure 7:
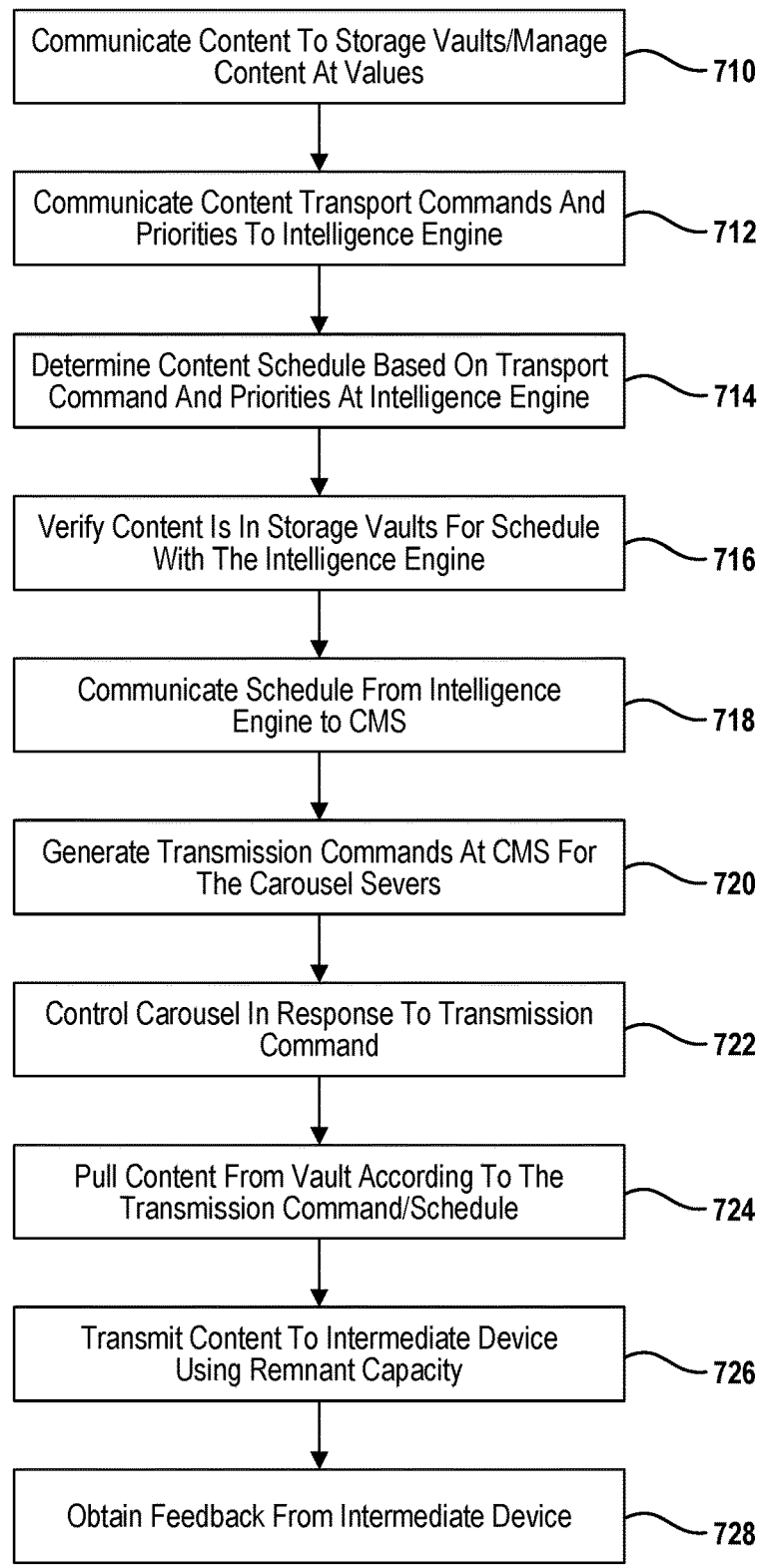
FIG. 7 is a flow chart of a method for communicating content to an intermediate device using remnant capacity.

Referring now also to FIG. 7, the ground station 520 may include a plurality of data carousel servers 620. The operation of the ground station 520 relative to the content partner premises 610 is set forth in FIG. 7. In step 710, the content is communicated to the storage vault and the content is managed at the storage vaults 560, 562 from the content partner video origin server 612. The storage vaults 560, 562 store the content therein. From CMS 614, content transport commands are communicated with priorities to the intelligence engine 572 from the content manager/scheduler 614 of the content partner premises. In step 714, a schedule for the distribution of the content is determined based upon the transport command and the priorities at the intelligence engine 572. The priority may be increased by payment from a partner provider. In steps 716, the content that is stored within the vaults is verified for the content schedule by the intelligence engine. That is, the intelligence engine 572 determines whether the vault contains the content for the schedule. In step 718, the schedule is communicated from the intelligence engine 572 to the content manager/scheduler (CMS) 570 of the ground station 520. In step 720, transmission commands are generated at the CMS 570 and communicated to the carousel servers 620. The carousel servers 620 are controlled in response to the transmission commands in steps 722 and format multiple paths. The repetition rate, the number of servers dedicated to a particular content and the bitstream may all be established with the transmission command so that the carousel servers are controlled in response thereto. When it is time for distributing the content, the carousel servers 620 pull the content from the appropriate vault according to the transmission command or the schedule associated with the transmission command in step 724. In step 726, the content is transmitted to the intermediate devices using the remnant capacity as determined by the intermediate device management server 580.

The content partner premises or the ground station 520 may receive feedback from the individual intermediate devices including usage trending, troubleshooting, preferences, demographics, behavioral data for advertising, pricing, intelligence engine performance and other analytic functions. The feedback is used to ultimately form the schedules and the different types of content that may be provided including various types of advertisements for the different systems.

Figure 8A:
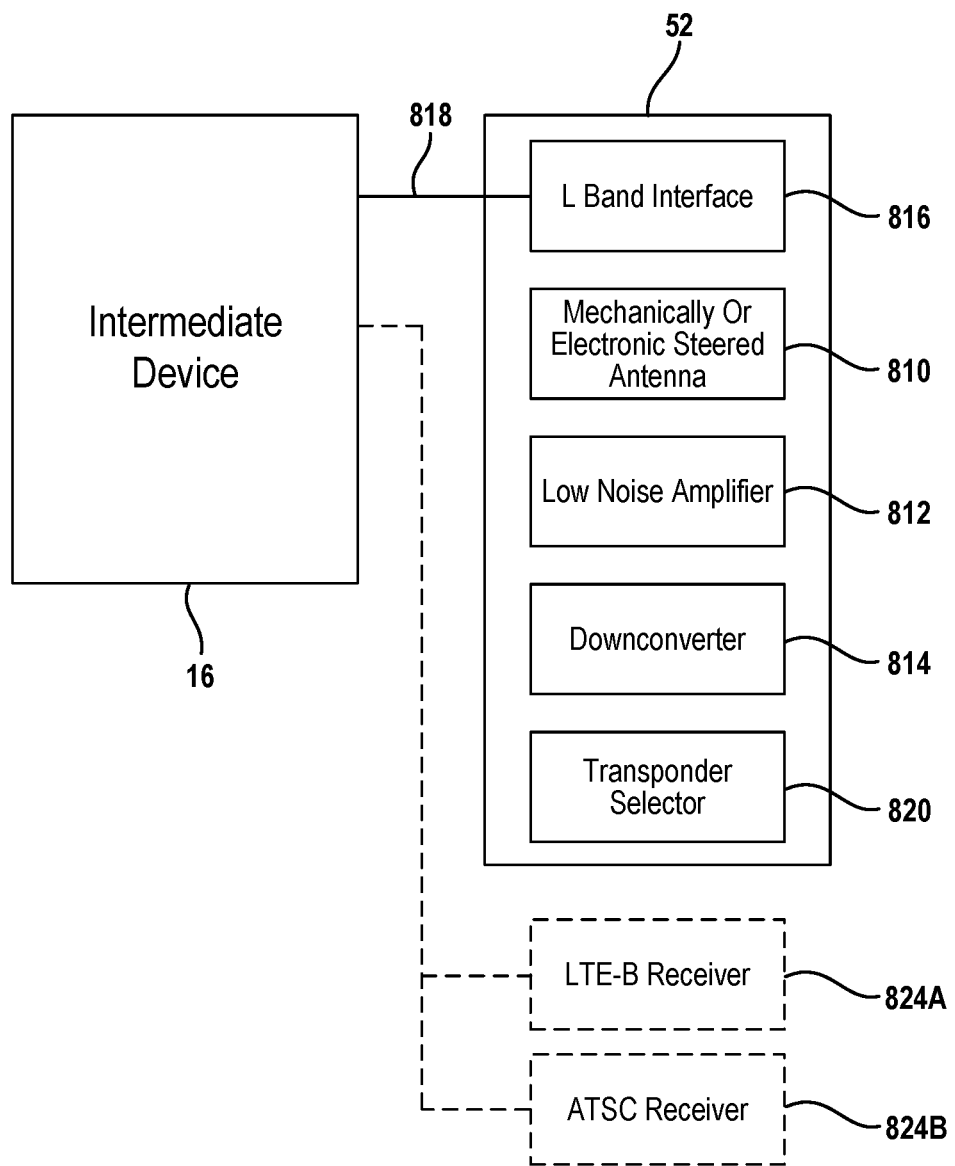
FIG. 8A is a block diagrammatic view of the outdoor unit of FIG. 1.
Figure 8B:
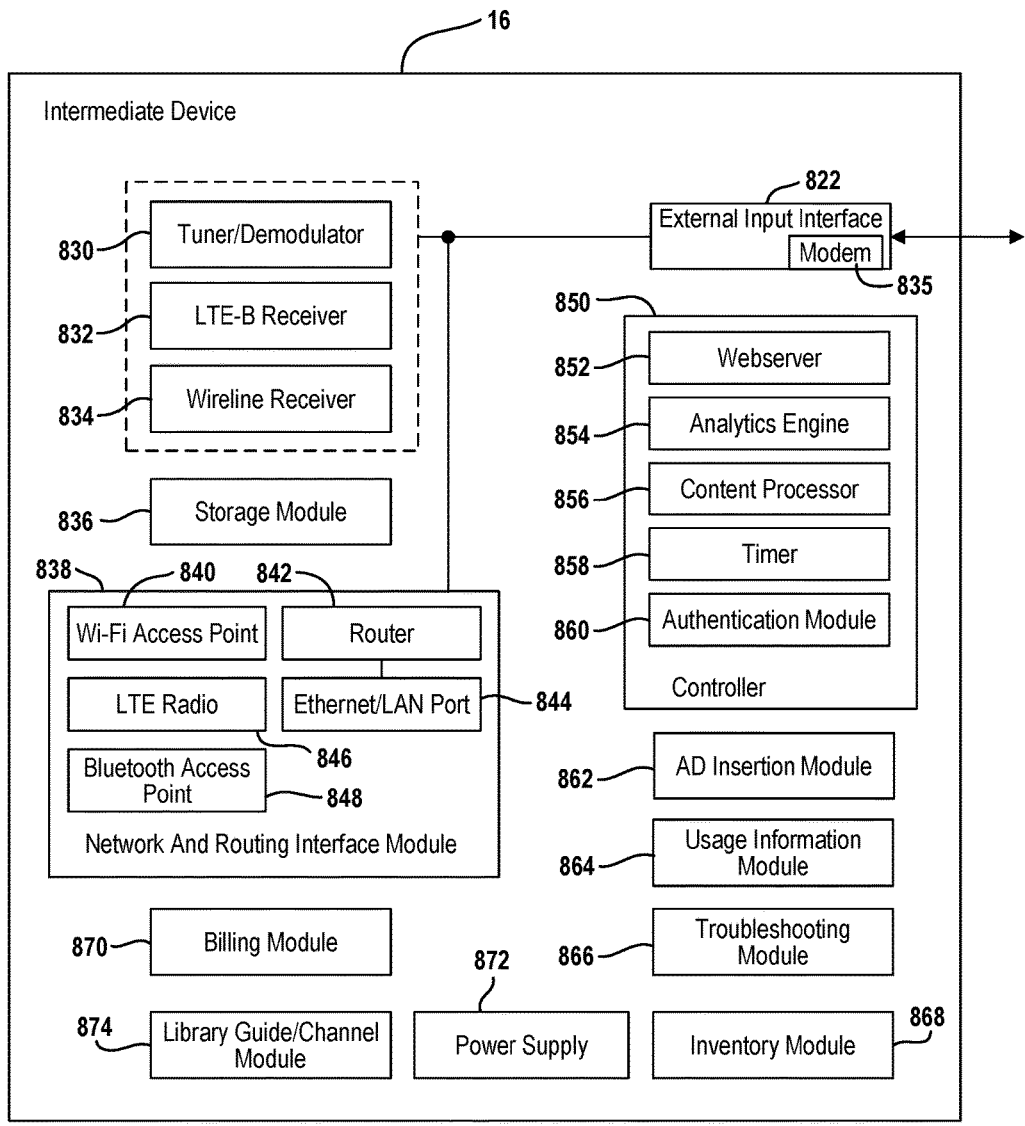
FIG. 8B is a block diagrammatic view of the intermediate device.

Referring now to FIGS. 8A and 8B, the intermediate device 16 relative to the outdoor unit system 52 are illustrated in further detail. The outdoor unit system 52 includes an antenna 810 that is mechanically or electronically steered. The antenna 810 may be a small size such as a 45 cm or 75 cm parabolic dish. A flat planer antenna may also be used and mounted flat on a rooftop, awning or on a vehicle. The antenna 810 may, for example, contain single, polarization, a single band wide aperture device or a dual polarization self-aiming adaptive array to allow the satellites to be followed. A parabolic antenna may be motorized to physically move to track the antenna flight path. If a phased array antenna is used, the phased array antenna can be electronically steered to view the satellite. The antenna is coupled to a low noise amplifier. That is, the satellite signals received at the antenna 810 are communicated to a low noise amplifier 812 to electronically amplify the signal. A down converter is used for down converting the received signals to L-band for transmission over a coaxial line. The down converter 814 communicates signals to the L-band interface 816.

The outdoor unit 52 may also include a transponder selector 820. The transponder selector 820 may be used for tuning to the proper transponder of the satellite for which content is to be received. As mentioned above, the various data including the time may be provided by the intelligence engine of the ground station. The signal may be received at the transponder and the transponder selector 820 tunes the antenna in response thereto.

The outdoor unit 52 includes a coaxial L-band interface 816 that may provide a powered connection to the outdoor unit 52. The L-band interface 816 may receive the L-band signal transmitted through the coaxial cable 818. Although an "L-band" signal is described, various other types of interfaces to various types of antennas and various frequencies may be used. Outside of a satellite system, a television antenna or an LTE antenna may be used and interface with the interface 816. The interface 816 may thus be configured to receive LTE-B (eMBNS or MBSFN) or may interface with an LTE-B receiver 824A or an ATSC receiver 824B for receiving over-the-air television signals with remnant capacity. The ATSC receiver 824B may be an ATSC 3.0 receiver. Thus, the intermediate device 16 may have a tuner demodulator 830 for tuning to and demodulating the signal received over the external input interface 822. The tuner demodulator 830 may tune and demodulate the L-band signal or an ATSC signal received through the input interface 822. The tuner demodulator 830 may also have error correction therein such as forward error correction (FEC). The intermediate device 16 may also have an LTE-B receiver 832 for receiving external inputs from the interface 822. The LTE-B receiver receives the broadcast signals over an ATSC system. A wireline receiver 834 may be used to receive networking traffic. The wireline 834 receiver may be a USB or HDMI interface.

The external interface 822 may also represent a connection to the Internet 18 through the wired or wireless communication network. That is, the external interface 822 may comprise a modem 835 for communicating content to the intermediate device 16.

The intermediate device 16 includes a storage module 836 that is used to store content therein. The storage module 836 may include solid state devices or a hard disk drive.

A networking and routing interface 838 may include various network and routing access points. For example, a WiFi access point 840 may be used to interface with a router 842. However, the router 842 may also be used for wired communications using the Ethernet/LAN port 844. The networking and routing interface 838 may include an LTE radio 846 for communicating LTE radio signals from the device. The LTE-B receiver 832, as well as the LTE radio 846, may be incorporated into a signal unit. The intermediate device 16 may also communicate using Bluetooth. That is, a Bluetooth access point 848 may be incorporated into the network and routing interface module 838.

The intermediate device 16 may include a controller 850. The controller 850 may perform many functions, including as a web server 852, an analytics engine 854 and a content processor 856. Although individual interconnections are not illustrated in FIG. 8B, the controller may control the underlying timing and functions of the various modules within the intermediate device. The web server 852 may communicate content from the intermediate device in an IP format. The controller 850 may also tune to the data at predetermined times as determined by the timer 858. The timer 858 may be synchronized with various other intermediate devices within the system using GPS or internet-based time standard. The content processor 856 tunes to receive the content at predetermined times, manages the storage of the content, verifies the integrity of the stored content and receives and manipulates manifest files which provide instructions for downloading the content. The analytics engine 854 handles the intermediate device-based analytic functions for the system.

Neighboring intermediate devices may also receive and transmit from the intermediate device 16. The network and routing interface 838 may communicate with other intermediate devices for receipt of content, content chunks or missing content at the storage module 836. Missing content may occur when network errors, hardware errors or weather prevent the content from being received at the storage module 836. Communication with other intermediate devices may take place using the web server 852 using an internet protocol.

The network and routing interface 838 may communicate a request signal to the communication system provider 12 or the content service provider 90 to request content chunks or missing content at the storage module 836. The communication system provider may communicate the requested content in a unicast manner using remnant capacity to the requesting intermediate device. A complete broadcast retransmission may also be performed in response to the request. Retransmission may occur if a significant number of intermediate devices request particular content.

An authentication module 860 may also be included within the controller 850. The authentication module 860 may communicate authentication signals to the communication system provider or for the content service provider so that the devices may intercommunicate properly. An unauthorized device may not be able to receive content from the communication system provider.

An ad insertion module 862 may be used for inserting ads at predetermined times during a broadcast. The ad insertion module 862 may splice ads based upon user preferences that are predefined. The ad insertion module 862 may act in response to a trigger for inserting advertisements that may be stored within the storage module 836.

A usage information module 864 may provide the communication system provider 12 or the content service provider 90 with information as to the usage of various information and programming within the intermediate device 16. By providing the usage information, content of interest may be communicated to the intermediate device 16. Usage information may also be data related to monitoring the utilization of the network that communicates the signals to the intermediate device 16.

A troubleshooting module 866 is used for transmitting troubleshooting information over the outbound signals to the analytics engine for analysis to identify problems with sourcing video files or the installation of the intermediate device 16.

An inventory module 868 stores an inventory of the content stored within the storage module 836. The inventory module 868 may also be used to remove content that has expired per the metadata received with the content. After the content expires, the inventory module 868 removes the content to free space within the storage module 836.

A billing module 870 may transmit billing information from the intermediate device 16 to the content service provider 90. The billing module 870 may collect viewed content and other information to provide billing to the owners of the intermediate device 16. The billing module 870 may also report inventory data from the inventory module 868 to the intermediate device.

The intermediate device 16 may also include a power supply 872 for powering the various modules therein.

The intermediate device 16 may also include a library guide/channel module 874. The library guide/channel module 874 will be described in further detail below. The library guide/channel module 874 may be used to assemble a program guide or virtual channel based upon the contents stored within the storage module 836. The operation of the library guide/channel module 874 will be described in more detail below. However, the intermediate device 16 may be used to formulate a virtual channel or multiple virtual channels as a series of content for displaying a user interface associated with the user device. In this manner, a familiar grid guide with a plurality of content may be selected by the user. Other types of guides such as a poster guide may also be formed from the library guide with content grouped according to a "channel." A channel may correspond to a typical broadcasting network that provides content to an underutilized area that has no capacity to otherwise receive the linear television channel or the content associated therewith.

Figure 9:
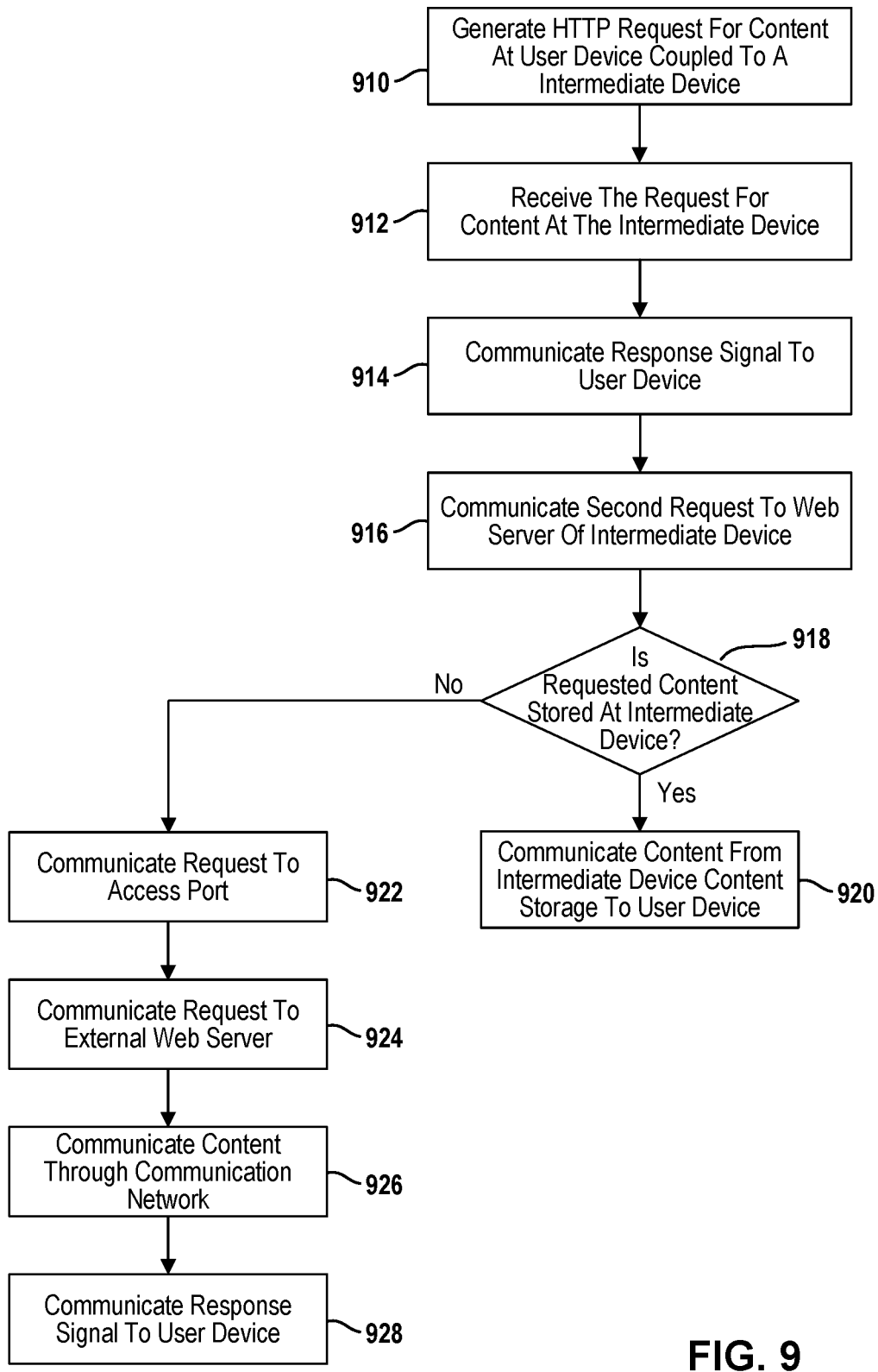
FIG. 9 is a flowchart of a method for redirecting requests from the user device to the intermediate device.

Referring now to FIG. 9, a method for redirecting requests at the intermediate device is set forth. In step 910, a request is received at the intermediate device from a user device, whether coupled to the intermediate device 16 through a local area network 310 or embedded in the intermediate device. The request may come from an application stored within the user device. In step 912, the intermediate device receives the request for content and redirects the user device to contact the web server. That is, in step 914, a response signal is communicated to the user device with the IP address of the intermediate device web server. In step 916, a second request for content is communicated to the web server of the intermediate device. In step 918, it is determined whether the content is stored at the intermediate device. If the content is stored at the intermediate device, content is communicated to the user device through the local area network or the direct connection from the intermediate device to the user device. In step 918, if the requested content is not stored at the intermediate device, step 922 may communicate a request through a port of the intermediate device to the content service provider 90 illustrated in FIG. 2 in step 924. The content may be provided through the communication network in step 926. In many cases, the content may be communicated in near real time or as soon as possible to the intermediate device. The content may also be queued for later delivery to the intermediate device. That is, the content may not be communicated until enough requests for the content may be provided. In step 928, a response signal from the content service provider 90 is illustrated in FIG. 2. The response signal in step 928 may also provide a time, transponder if applicable, and a communication channel or time. The intermediate device may store such subsequently communicated content from the content service provider 90 in the content storage of the intermediate device 16, so subsequent requests for such content from user devices can be served directly from the intermediate device 16, instead of needing to be acquired from the content service provider 90 using a communication network.

The steps of directing and redirecting 914-922 make take place using a domain name server (DNS) associated with the web server of the intermediate device, and/or a web server associated with the communication system provider or the content service provider.

Figure 10:
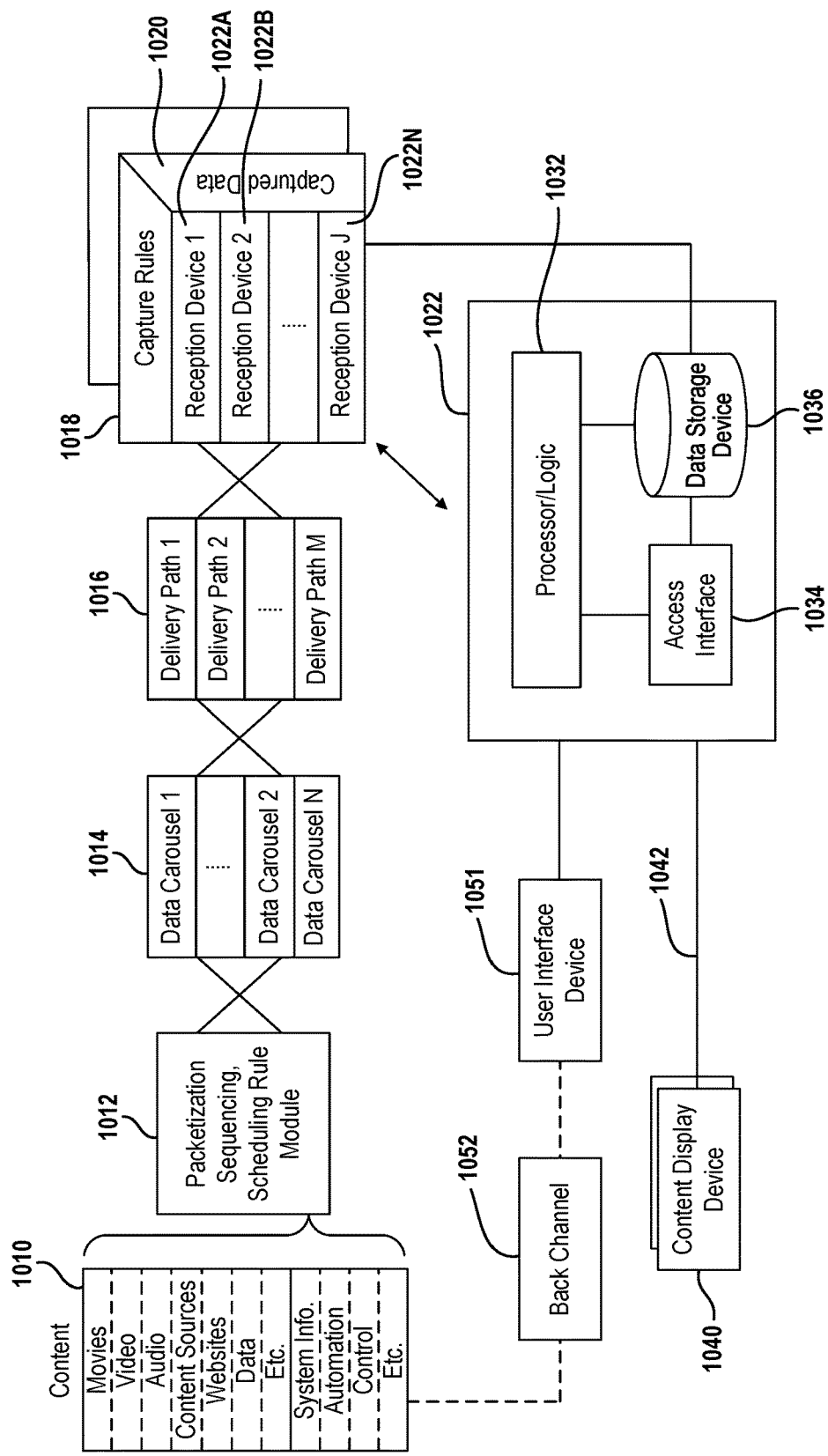
FIG. 10 is a block diagrammatic view of a non-real-time content delivery system.

Referring now to FIG. 10, a high level block diagrammatic view of a simplified system is set forth. Content in block 1010 may include movies, video, audio, content sources, websites, data, etc. The content may also provide system information, automation information and control information. Various types of content are provided to a packetization, sequencing and scheduling rule module 1012. The packetization, sequencing and scheduling rules are used to fill a plurality of data carousels 1014 with data and communicate the content to fulfill the schedule. The scheduling rules may provide the data carousel 1014 with time periods for broadcasting using the remnant capacity of various types of delivery paths. A plurality of delivery paths 1016 such as satellite broadcasting over the air, ATSC broadcasting, cable broadcasting and the like may be used for communicating content, including prioritizing use of one such delivery path 1016 for delivery of certain data carousels 1014 or certain content within a data carousel 1014 over use of another such delivery path 1016 for delivery of the other carousels 1014 or content. Various capture rules 1018 are used to capture the captured data 1020 at various reception devices or intermediate devices 1022A-1022N. The capture rules may be communicated as control content from block 1010. That is, various capture rules including the content to be captured, the time to be captured, a transponder to be captured from, and other data may be used as the capture rules. The intermediate devices 1022A-1022N may be intermediate devices as described above. The intermediate devices 1022A-1022N for different customers may be programmed differently. That is, the intermediate devices 1022A-1022N may have different capture rules and each intermediate device may capture different captured data 1020.

The intermediate devices 1022A-1022N are collectively referred to as an intermediate device 1022. Each intermediate device 1022 may have processor logic 1032 therein. An access interface 1034 allows the intermediate device 1022 to access various interfaces for receiving and transmitting data therefrom. A data storage device 1036 stores data within the reception devices for eventual playout at a content display device 1040. The content display device may be communicated to the intermediate device 1022 using a connection 1042. The connection 1042 may be a network connection or a direction connection. The connection 1042 may, for example, be a home network, a WiFi network, an HDMI cable, a USB cable, Bluetooth or the like.

The intermediate device 1022 may also use a user interface device 1051 for generating a back channel 1052 to control the content that is provided from the content service provider 90 or the communication system provider 12. The user interface device 1050 may be various types of devices such as a remote control, a smartphone or the like. The back channel 1052 may be an internet path, a phone path or various other types of wired or wireless paths. The back channel may be though one of the communication networks 14 or 14'. A return satellite path may also be used. The back channel may also use the remnant capacity of one of the types of terrestrial networks described above. For example, the remnant capacity of an LTE system may be used.

Figure 11:
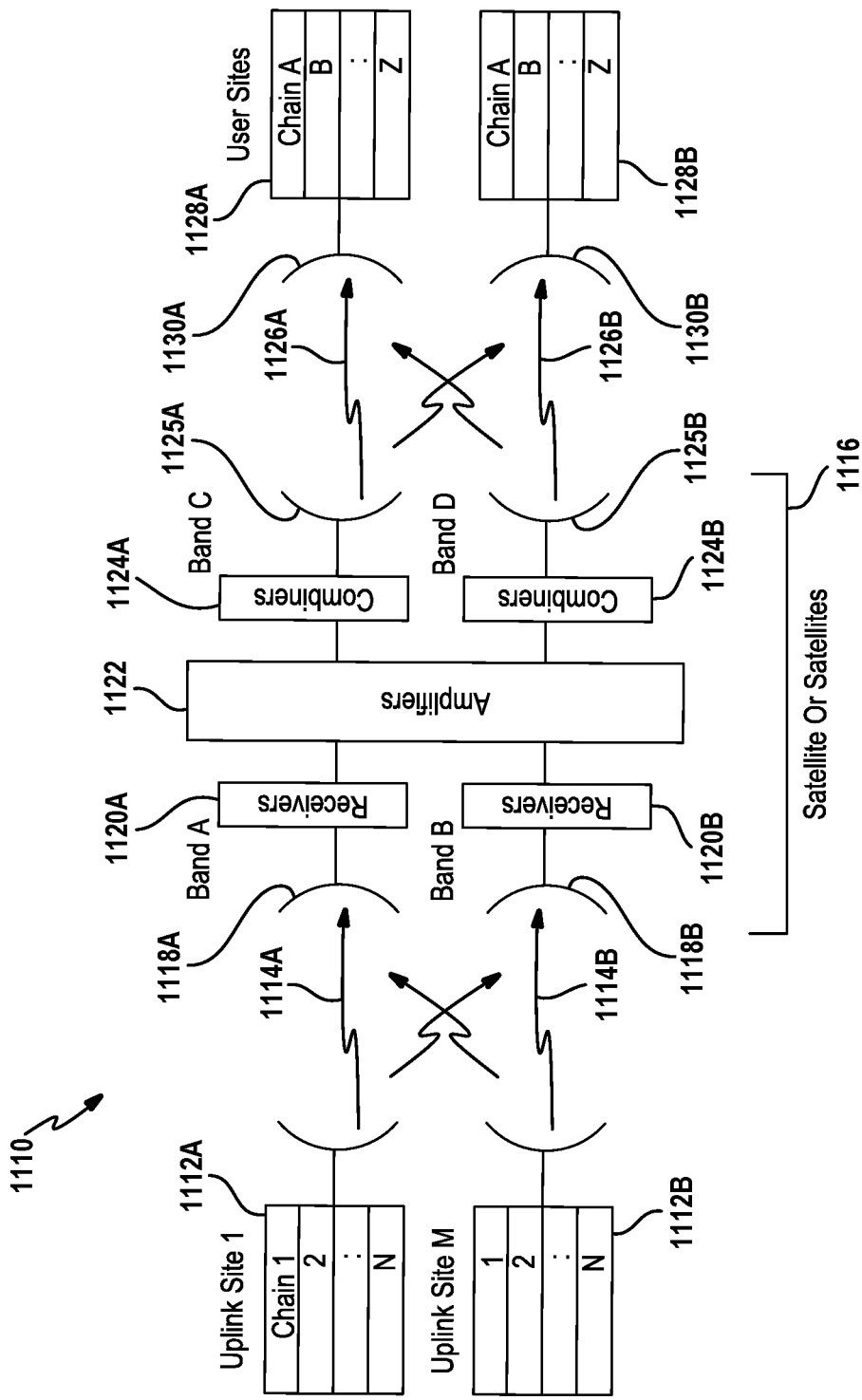
FIG. 11 is a block diagrammatic view of a satellite implementation of a non-real-time content delivery system.

Referring now to FIG. 11, a satellite broadcast implementation 1110 is set forth. Various uplink sites 1112A and 1112B may be used for uplinking content to a satellite. The uplink sites generate uplink signals 1114A, 1114B. The uplink signals 1114A, 1114B are received by a satellite 1116 through a first receiving antenna 1118A and a second receiving antenna 1118B. The first antenna 1118A may correspond to a first frequency band Band A and the second antenna 1118B may correspond to a second frequency band Band B. A plurality of receivers 1120A and 1120B receive the uplink signals 1114A and 1114B where they are converted to a different frequency for transmission through the satellite 1116 at the receivers 1120A and 1120B. Amplifiers 1122 amplify the signals. The amplifiers 1122 may be travelling wave tube amplifiers. A plurality of combiners 1124A and 1124B combine the signals from the various amplifiers for transmission through downlink antennas 1125A, 1125B that generate downlink signals 1126A and 1126B. The downlink signals 1126A and 1126B may be frequency and geographic dependent. That is, various frequencies may be used in adjacent signals so that interference between the downlink signals 1126A and 1126B is not formed. Various user sites that represent intermediate devices or other user devices 1128A and 1128B receive various chains from the downlink signals received by the downlink antennas 1130A and 1130B. The antennas 1130A and 1130B may be tracking antennas for tracking the positions of the satellites if middle or lower orbit satellites are used. Certainly, remnant capacity of geostationary satellites may be used so that tracking antennas are not required.

Figure 12:
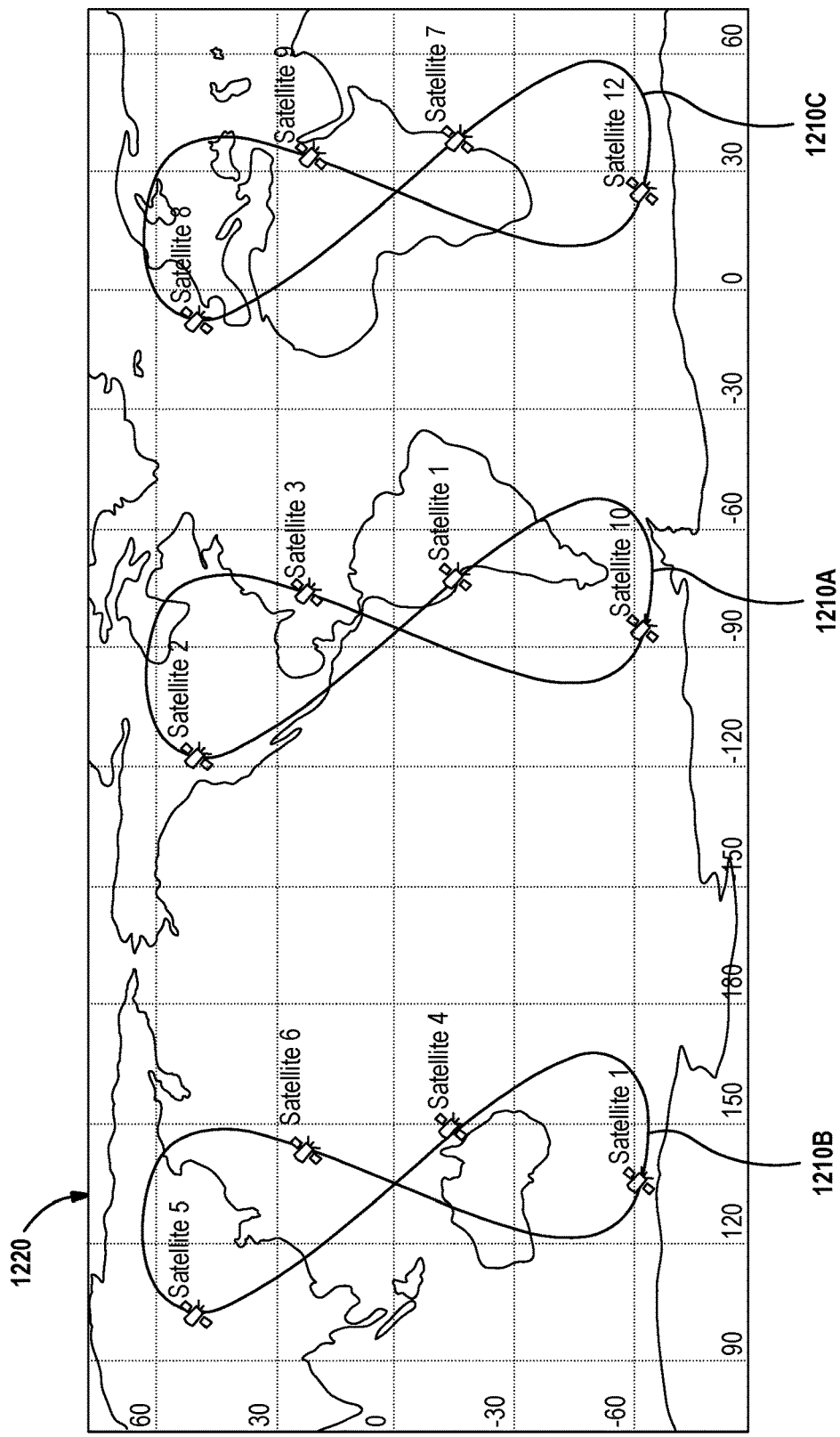
FIG. 12 is a view of three satellite ground traces used for the content delivery system.

Referring now to FIG. 12, the ground tracks of the system relative to the Earth 1220 are illustrated in further detail. In this example, a ground track 1210A has a first satellite Satellite 1, a second satellite Satellite 2 and a third satellite Satellite 3. A second ground track 1210B has a fourth satellite Satellite 4, a fifth satellite Satellite 5 and sixth satellite Satellite 6. A third ground track 1210C has a seventh satellite Satellite 7, an eighth satellite Satellite 8 and a ninth satellite Satellite 9. The satellites 1-9 may be used in an initial deployment of the satellite system. Satellites 10, 11 and 12 may be added to further expand the operating characteristics of the system. The ground traces are formed by inclined orbital satellite systems. The satellite system is a non-geostationary orbit satellite system with geosynchronous periods that can cover two north-south zones. By providing higher elevation angles for the ground terminals, better coverage and more constant coverage for the ground served by the satellites is provided. Frequencies used for uplinking and downlinking may be portions of the Ka and Ku bands. Both right hand circularly polarized and left hand circularly polarized antennas may be used for both transmitting and receiving. By providing three sets of ground traces as illustrated in FIG. 12, three different regions of the Earth can be covered. In an initial deployment, Satellites 1-3 may be used to cover both North America and South America. Eastern Asia and Australia may be covered with Satellites 4-6. Africa and Europe may be covered with Satellites 7-9. However, should the capacity or desired maximum elevation angle require the additional satellites, satellites 10-12 may be added to the system.

Figure 13:
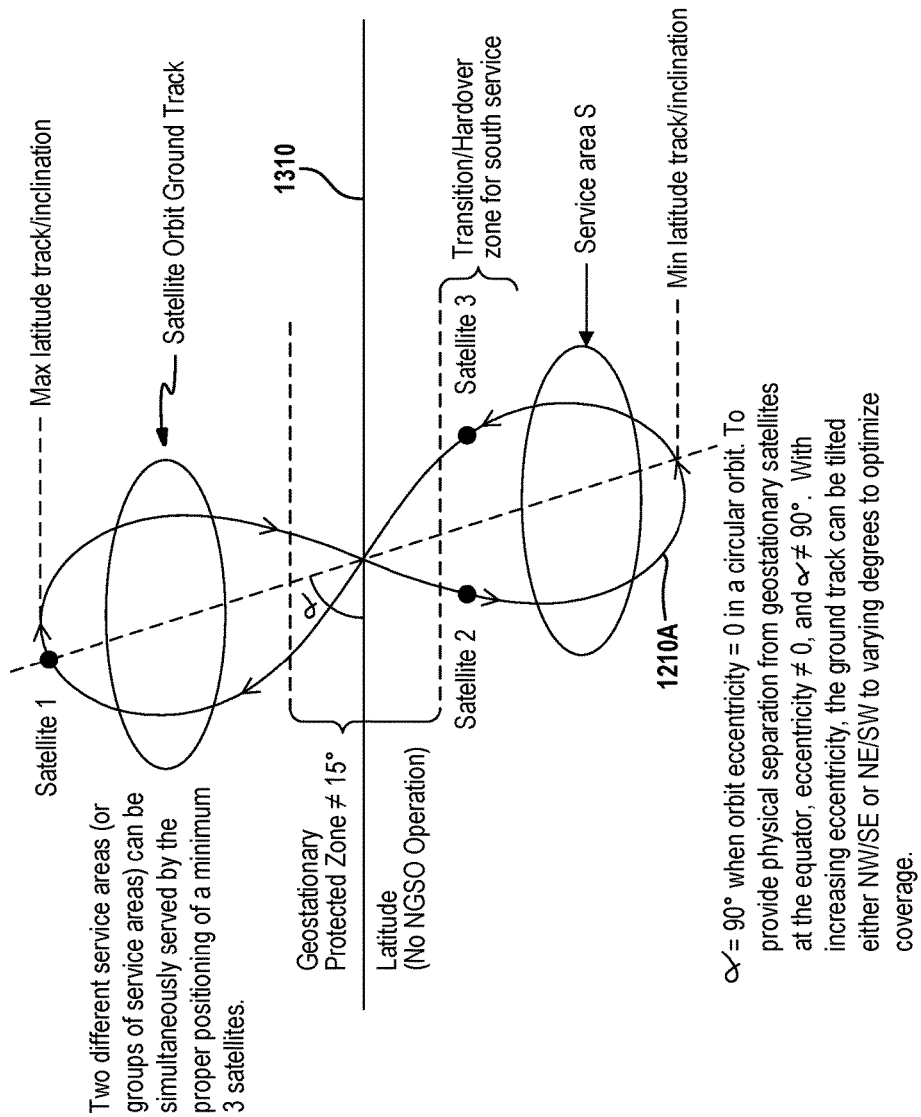
FIG. 13 is an example of a ground trace having various parameters associated therewith.

Referring now to FIG. 13, the ground trace 1210A is illustrated in further detail. A geostationary protective zone of 15° north and south of the equator may be provided so that interference with other satellites is not present using the system. Two different areas north and south of the equator can be served by positioning the three satellites in the illustrated configuration. Angle α is 90° when the orbit eccentricity is zero in a circular orbit. To provide a physical separation for geostationary satellites at the equator, the eccentricity is no zero and therefore the angle α is not 90°. With increasing the eccentricity, the ground track can be tilted northwest, southeast or northeast-southwest to vary the degrees of optimization coverage. The equator is represented as line 1310 in FIG. 13. As the satellites traverse the orbit, one satellite is rising while the other is setting in each of the upper hemisphere and lower hemisphere.

Figure 14A:
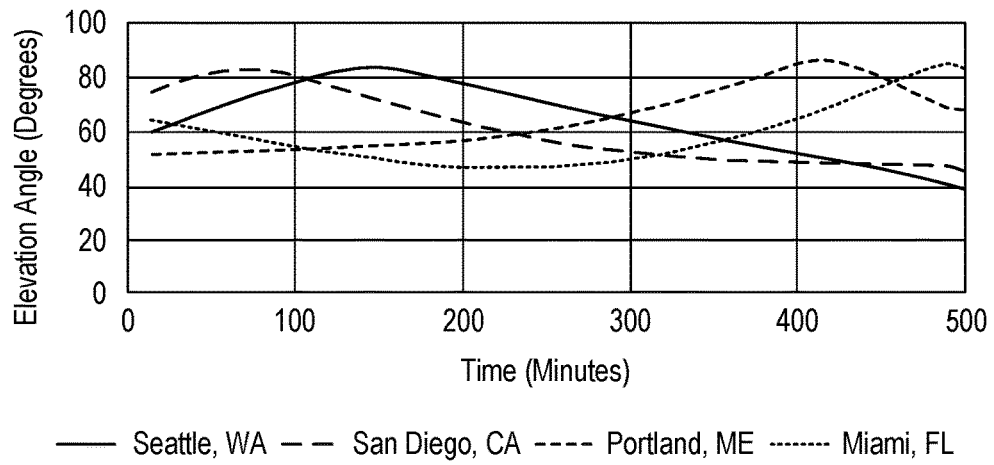
FIG. 14A is an elevation angle vs. time plot for four cites; Seattle, San Diego, Portland and Miami.
Figure 14B:
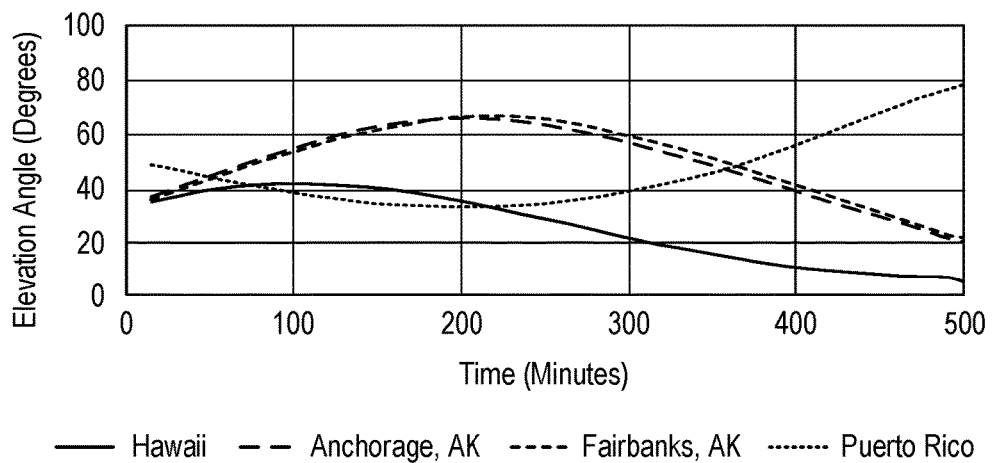
FIG. 14B is an elevation vs. time plot for further reaches of the content delivery system; Hawaii, Anchorage, Ak., Fairbanks, Ak. and Puerto Rico.

Referring now to FIG. 14A, the elevation angle with respect to time for four different cities such as Seattle, San Diego, Portland and Miami is set forth. The time period takes place over 500 minutes and, as can be seen, the elevation angle at any time in any of the four cities is above 40°. In further areas illustrated in FIG. 14B, Hawaii, Anchorage, Ak., Fairbanks, Ak. and Puerto Rico have elevation angles above 20° for most of the time. The switching between different satellites as one is rising and the other is setting is called handover. Handover may occur to maintain minimal elevation angle. When a fourth satellite is added, minimum elevation angles may be maintained for both the northern and southern hemispheres. The satellite antennas associated with this system will be programmed to switch from one satellite to another satellite. Switching should also not be a problem for the receiver since the system is providing non-real-time service.

Figure 15:
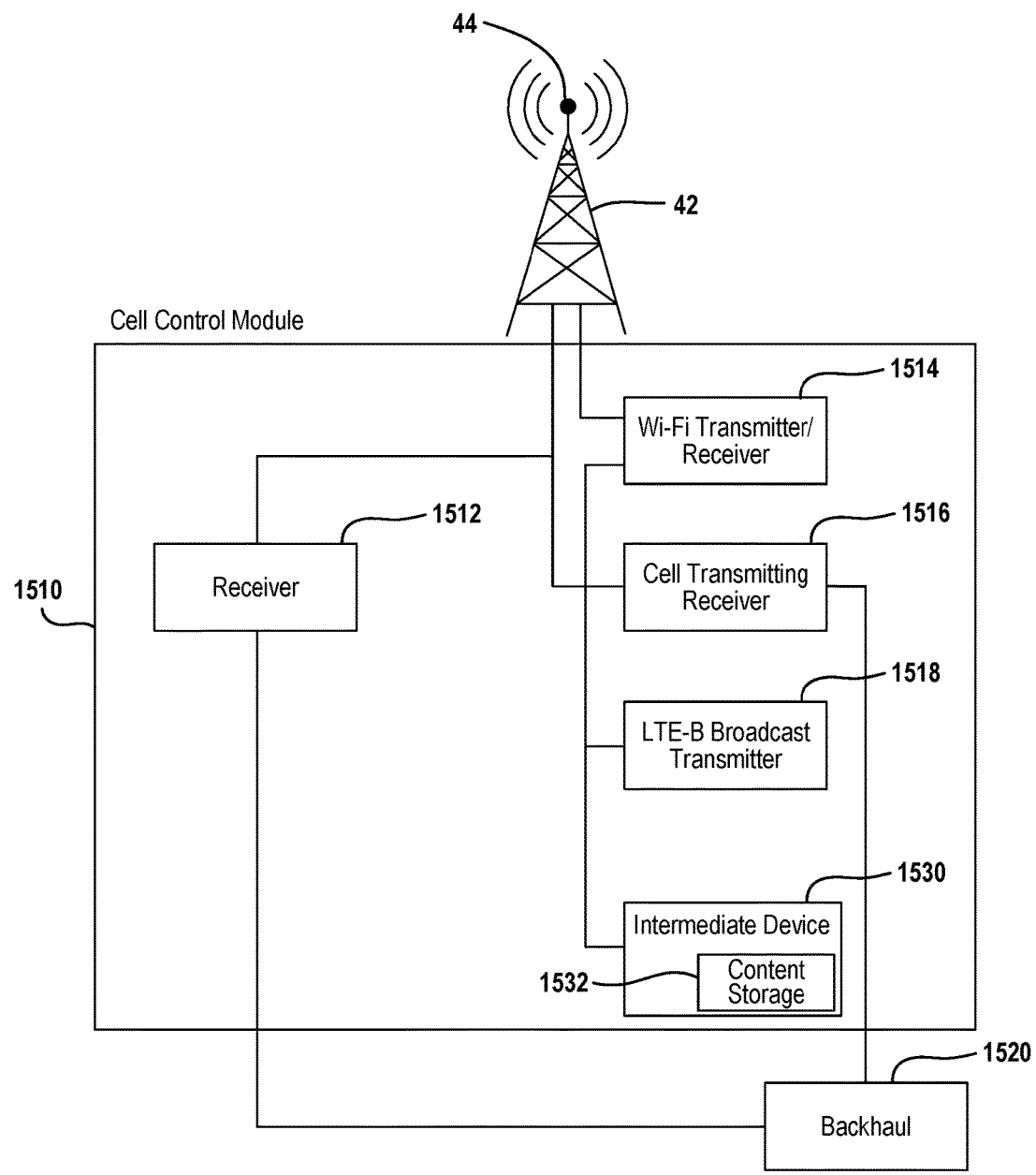
FIG. 15 is a block diagrammatic view of a cell control module.

Referring now to FIG. 15, the cell tower 42, the antennas 44 and the cell control module 1510 associated therewith are illustrated in further detail. The antenna 44 may actually be a plurality of antennas. The antennas 44 may be disposed in panels and thus face in various directions to provide spatial diversity. The antennas 44 may also be a combination of transmitting antennas, receiving antennas for the LTE system. The system may also include a wireless or WiFi antenna for transmitting and receiving wireless or WiFi signals. The signals under the wireless or WiFi system may be used for return signals from the various intermediate devices. The system may thus include a LTE receiver 1512, a wireless network or WiFi system 1514, a cell transmitter 1516, and an LTE-B broadcast transmitter 1518. The cell transmitter 1516 may also act as a receiver for receiving signals from the back haul 1520. The back haul 1520 may return signals to the system for analysis and request purposes. The back haul 1520 may then communicate the signals to the communication system provider or the content service provider.

The cell tower 42 may also have an intermediate device 1530 associated therewith. The intermediate device 1530 may be configured in a similar manner to that described above. In this case, however, the WiFi system 1514 both transmits and receives signals and forms a WiFi network with the various intermediate devices within its transmitting area. The intermediate device 1530 may also have a content storage 1532 and other associated circuitry of the intermediate device described above. The content storage 1532 may receive content from the communication system provider. The WiFi system 1514 may be formed using WiMax or other suitable technology.

Figure 16:
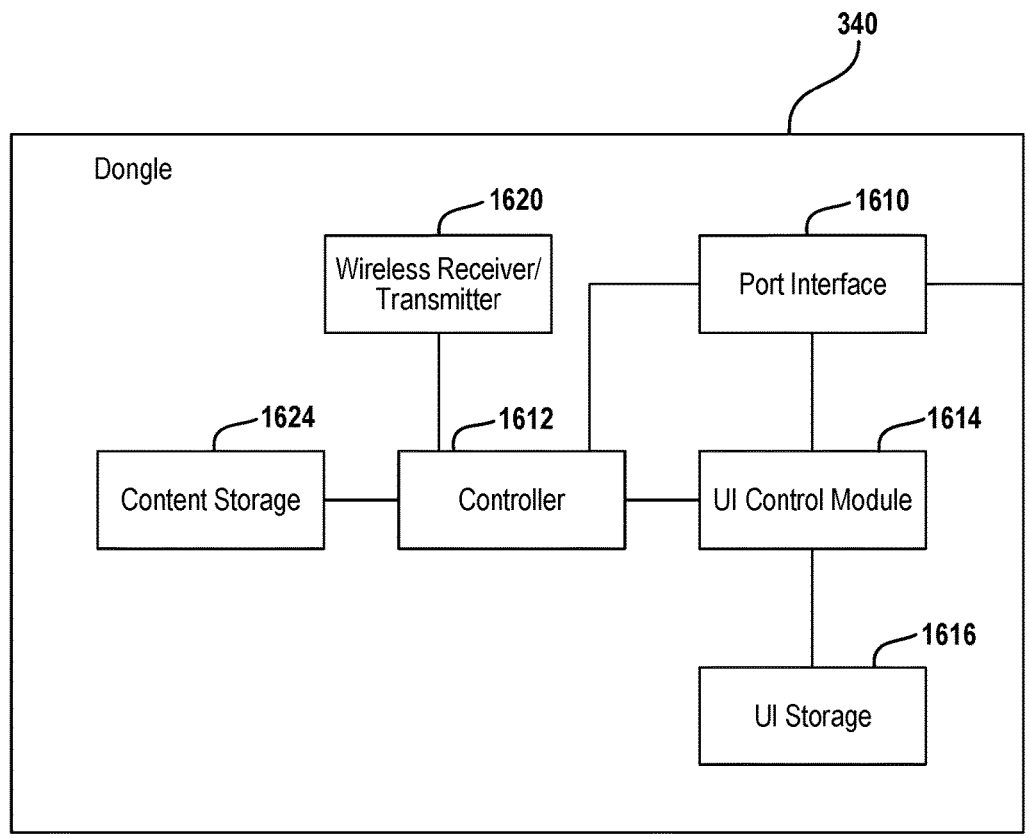
FIG. 16 is a block diagrammatic view of a dongle according to the present system.

Referring now to FIG. 16, the dongle 340 illustrated in FIG. 3 is set forth in further detail. The dongle 340 may include a port interface 1610 which is used for communicating with a port in the connected device. That is, the port interface 1610 may use a standard such as USB or HDMI. The port interface 1610 is coupled to a controller 1612. The controller 1612 may control various aspects of the dongle. The controller 1612 may be in communication with a user interface control module 1614. The user interface control module 1614 may be used for generating user interfaces through the port interface 1610 and on the screen of the attached user device. A user interface storage 1616 provides data for forming the graphics associated with the user interface. The wireless receiver/transmitter 1620 is coupled to the controller 1612. The wireless receiver/transmitter 1620 may receive content from or through the local area network in which the dongle 340 is associated. The wireless receiver/transmitter 1620 may also transmit feedback signals through the local area network to the communication system provider or the content service provider. The received content may be stored by the controller 1612 in a content storage 1624.

Figure 17:
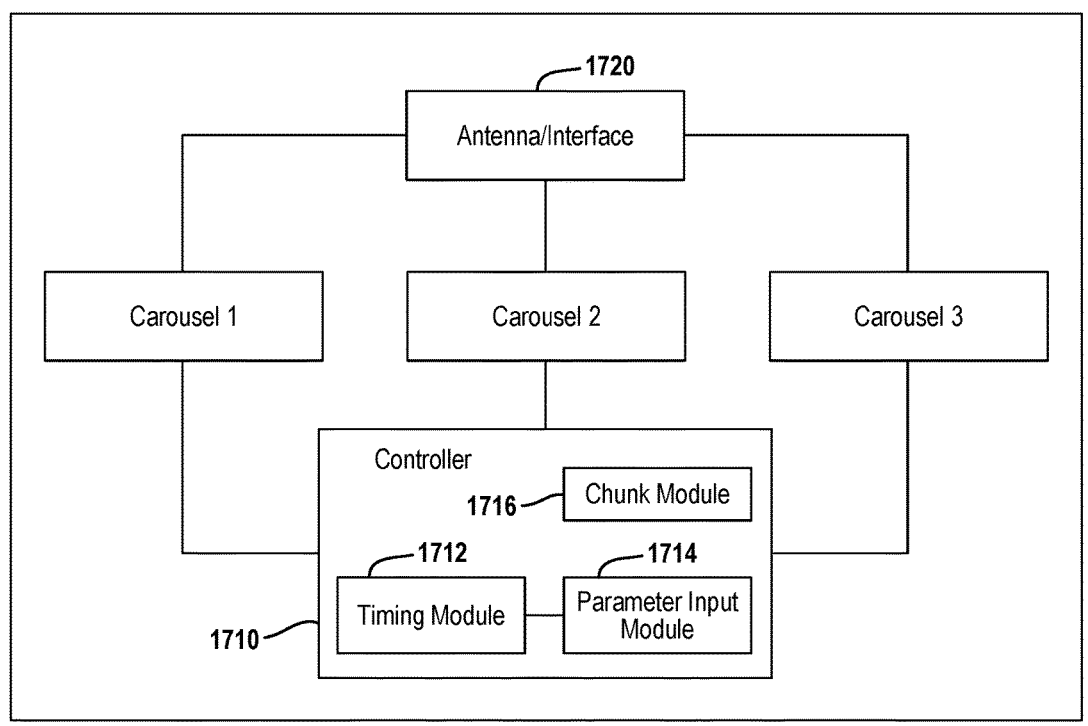
FIG. 17 is a block diagrammatic view of a carousel and controller for the carousel.

Referring now to FIG. 17, a representation of the carousel servers 620 is set forth. In this example, the carousel servers are represented by Carousel 1, Carousel 2 and Carousel 3. A controller 1710 is coupled to each of the carousel servers. A timing module 1712 is used for controlling the timing associated with the carousel. The timing may be a repetition rate for each of the carousel servers or the bit rate. That is, the amount that the carousel repeats a particular piece of content may be changed by the timing module. Carousel 1, Carousel 2 and Carousel 3 may all have different repetition rates for the content therein. The amount of throughput of each of the carousel servers may also be changed. A parameter input 1714 may be used to adjust the timing module. The amount of use or popularity of the content may be used to adjust the timing module 1712. Various other parameter inputs such as priority may be used to adjust the timing of the carousels based on the timing module. For example, emergency alert notifications may have a higher priority or higher repetition rate. Critical software updates and instant replays may also have a high repetition rate due to a high priority. A full length movie may have a lower repetition rate. As mentioned above the repetition rate may also be changed based on a monetary value assigned to the content.

The controller 1710 may also present the Carousel 2 with various chunks of data using the chunk module 1716. The chunk module 1716 may break the content up into chunks which comprise a plurality of packets. Each of the chunks may be the same in size or may vary in size. Chunks of the content are provided to each of the carousel servers. An antenna/interface 1720 may be coupled to each of the carousel servers for communicating the content to the communication system provider. The communication system provider may then communicate the content to the intermediate devices.

Figure 18:
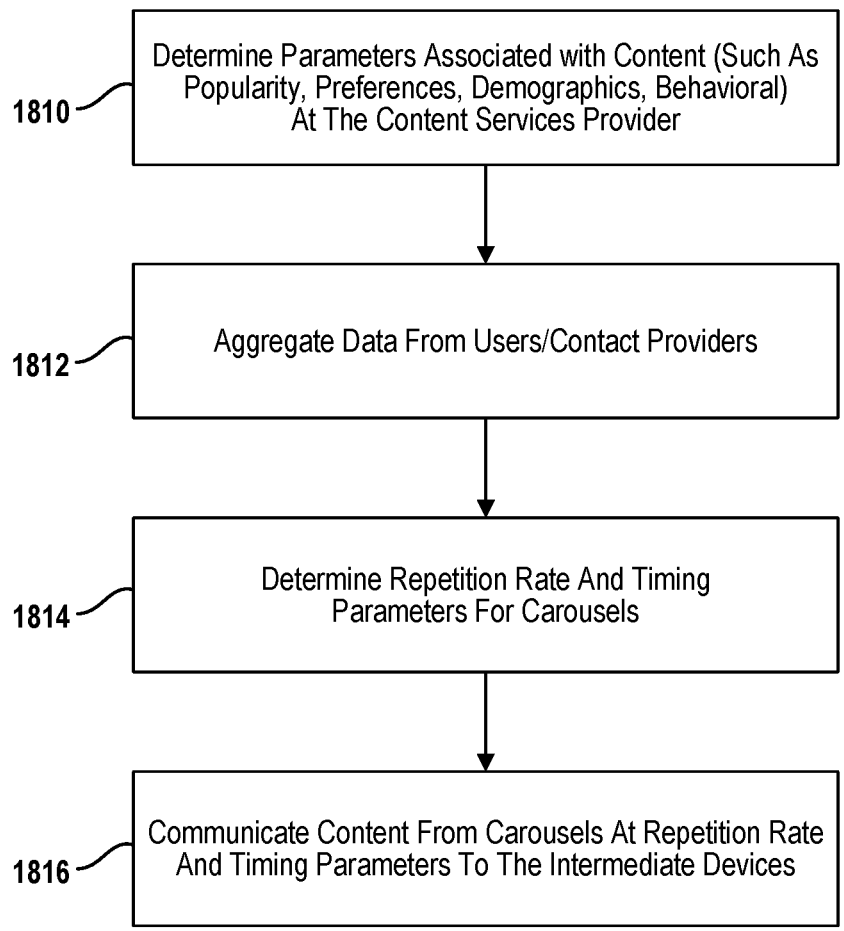
FIG. 18 is flowchart of a method of broadcasting content from a carousel.

Referring now to FIG. 18, a method for controlling the parameters associated with the carousel servers illustrated in FIG. 17 is set forth. In step 1810, the parameters associated with content such as popularity, preferences, demographics, monetary value and behavioral actions may be communicated from the users to the content providers at the content service provider. In step 1812, the parameters may be aggregated from the users or the content providers. The repetition rates, bit rates and other timing parameters for the carousels are determined in step 1814. In step 1816, the content is communicated from the carousels at the predetermined repetition rate. The communication may be performed by broadcasting.

Figure 19:
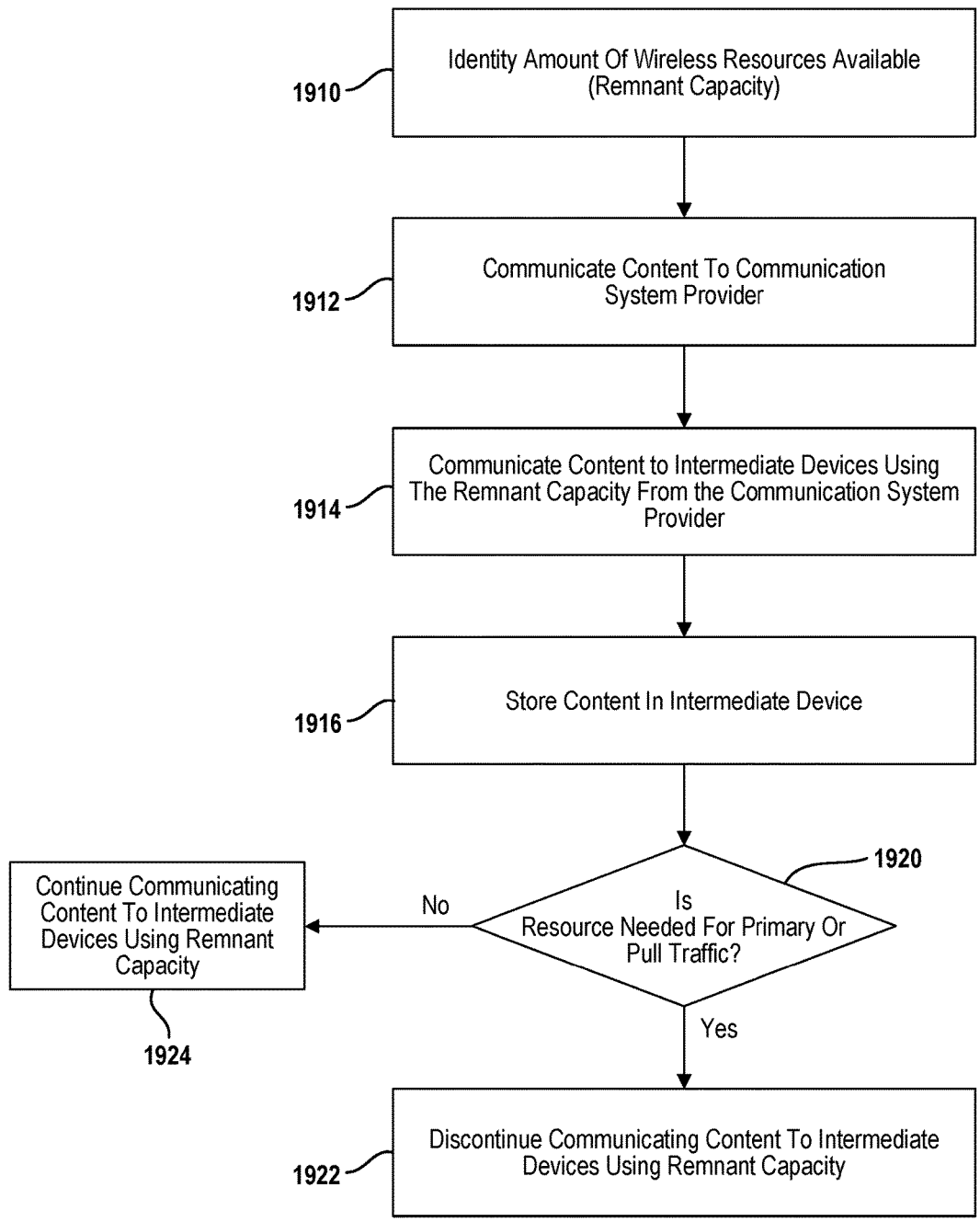
FIG. 19 is a flowchart of a method for communicating content through intermediate devices using remnant capacity.

Referring now to FIG. 19, a method of operating the communication system provider is set forth. In step 1910, an amount of a wireless resource or resources available are identified. The available resources may be remnant capacity as described above. The amount of resources identified as available may be currently available or may be forecasted to be available in the future. Depending on the communication system being used, the type of resources available may vary. However, in all cases, unused capacity is one available resource. The unused resource for a satellite may be bandwidth associated with one or more transponders. If spot beams on a satellite are used, a spot beam resource not being fully utilized may also be the remnant capacity. In an LTE system, when the LTE peak, regular capacity is not being fully utilized, there may be bandwidth available for remnant capacity use. For example, LTE-B transmissions may be scheduled using the portion of the LTE system that is available for remnant capacity use. For an ATSC or ATSC 3.0 digital television systems, the bandwidth used for broadcasting a channel may not require the entire channel for broadcasting. Excess capacity within the digital channel may be used to communicate content to various providers. In all systems, available frequencies, available time, available space spaced upon directional capacity, and available codes may form the remnant capacity.

Remnant capacity can be capacity available outside of the capacity that is required to serve a similar type of traffic that is increasingly served during peak network use and served less-so during non-peak network use. Remnant capacity can also be capacity available for content pre-positioning at the intermediate devices and within their content storage and subsequent consumption of that content by users directly from the intermediate devices, and which is not the capacity required for real-time voice and data requests from users or for distribution of content to users and for its immediate consumption. To identify remnant capacity usage patterns of the "primary, non-remnant" network may be reviewed. Remnant capacity may be automatically identified on a real-time basis by receiving information as to the amount of network not-being-consumed for "primary, non-remnant" use. The identified capacity may be automatically provisioned for use as the remnant capacity in response thereto. "Primary, non-remnant" capacity may run in parallel to "remnant" capacity use such that both are running across the entirety of the resource the entirety of the time but assigning a lower QoS value or identifier to the remnant capacity use so that remnant capacity is only used whenever such resources are not being used by a higher QoS "primary, non-remnant" use.

In step 1912, content is communicated to the communication system provider. Content may be communicated to the communication system provider from the content service provider or a content source, either before or after a resource is available. In step 1914, the content is communicated to the intermediate devices using the remnant capacity from the communication system provider. The content communicated is pre-positioned using remnant capacity, and thus is not communicated for real time consumption or in response to a real-time voice or data request from an intermediate device. The content may be communicated in various chunks which may not arrive in time or sequence for real-time playback from the intermediate device.

In step 1916, the content is stored within the intermediate device. In step 1920, it is determined whether the resource is needed for pull traffic, or traffic that is communicated for real time consumption or in response to a real-time voice or data request, or other communications instead of for pre-positioning. This step may be performed on a periodic or regular basis so that if a resource is needed for pull traffic, including for customers demanding a resource for data, voice or other communications for immediate use, then it is made available for that. If the resource is needed for primary service traffic or pull traffic, step 1922 discontinues communicating content to the intermediate devices using the remnant capacity. In step 1920, if the resource is not needed for primary service traffic or pull traffic, the content continues to be broadcast using the remnant capacity in step 1924.

Figure 20:
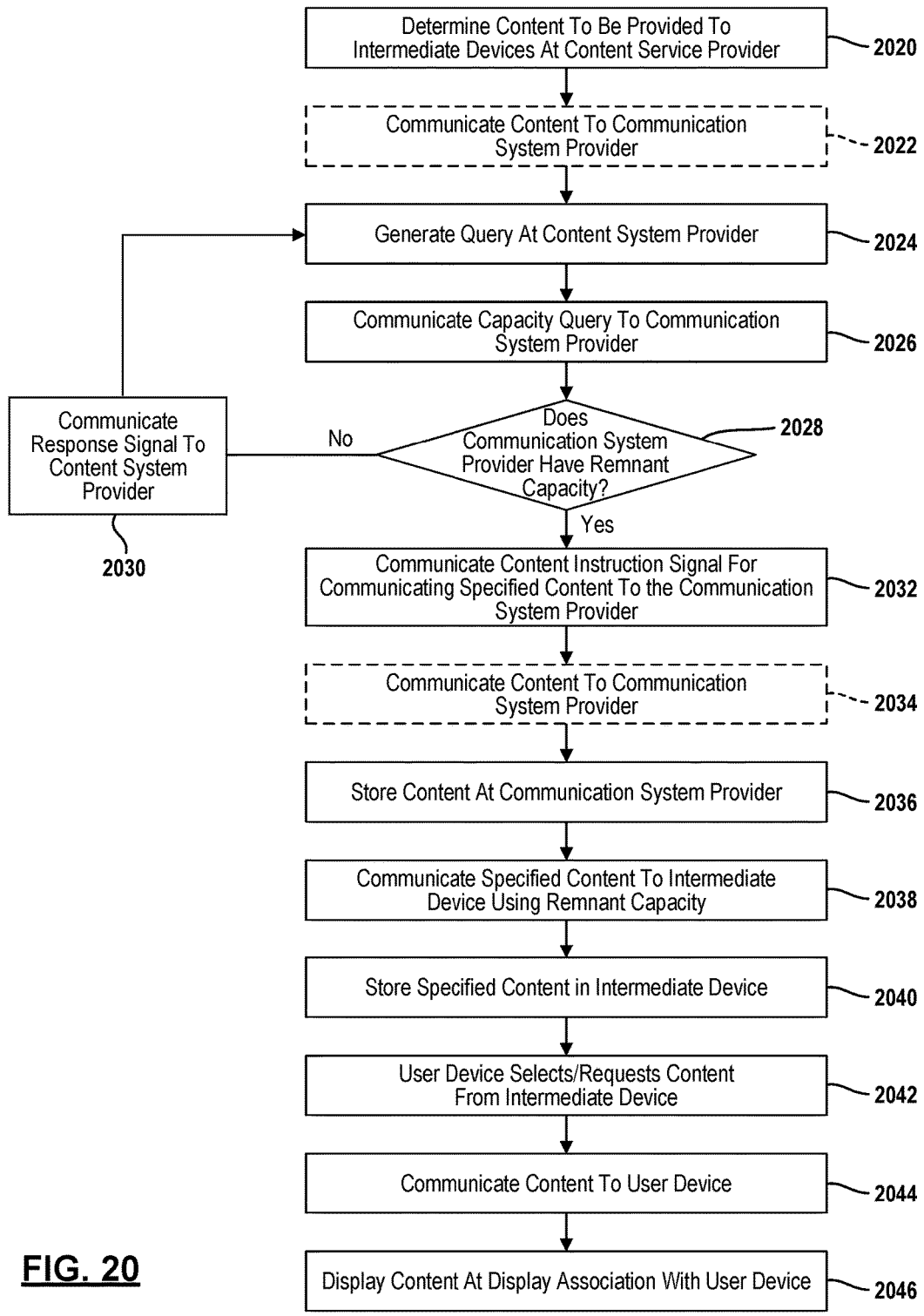
FIG. 20 is a flowchart of a method for communicating content using remnant capacity in greater detail.

Referring now to FIG. 20, a more detailed process for using remnant capacity is set forth. In step 2020, the content to be provided to the intermediate devices is determined by the content service provider. The content service provider may use various types of feedback from the intermediate devices including preferences such as favorites lists, popularity of content, demographics and behavior of the users associated with each of the intermediate devices. In step 2022, content is communicated to the communication system from a content provider or from a content service provider. This step may be performed at any time. In step 2024, a query is generated at the content system provider to determine whether remnant capacity is or will be available. The capacity query is communicated to the communication system provider in step 2026. In step 2028, it is determined whether the communication system provider has remnant capacity. The remnant capacity was described in FIG. 19. If there is no remnant capacity available, a response signal is communicated to the content system provider. The response signal is indicative of no capacity or remnant capacity being available.

In step 2028, if the communication system provider does have remnant capacity, a content instruction signal for communicating the specified content to the communication system provider is performed in step 2032. The content instruction signal may specify predetermined content or may be general for the next content that the content service provider wishes to communicate. In step 2034, content is provided to the communication system provider. As mentioned above, content may be communicated at various times during the process. In step 2036, the content is stored at the communication system provider.

In step 2038, the specified content is communicated to the intermediate device using the remnant capacity. The remnant capacity available at any predetermined time might not fit an entire piece of content. That is, the content may be broken into chunks which are placed into the remnant capacity time periods. For example, a high definition movie is about two gigabytes. However, the amount of remnant capacity may only be available in kilobyte or megabyte sized time slots. Therefore, the content may be broken down into chunks and filled with the content.

In step 2040, the specified content is received and stored at the intermediate device. Once the content is stored in the intermediate device, step 2042 is performed in which the content is selected or requested by a user device associated with the intermediate device. In step 2044, the content is communicated from the intermediate device to the user device in real time upon request. Because the content is only stored in the intermediate device, communication through a local area network or wireless area network or through a direct connection may be performed. In step 2046, the content is displayed at a display associated with the requesting user device.

Figure 21:
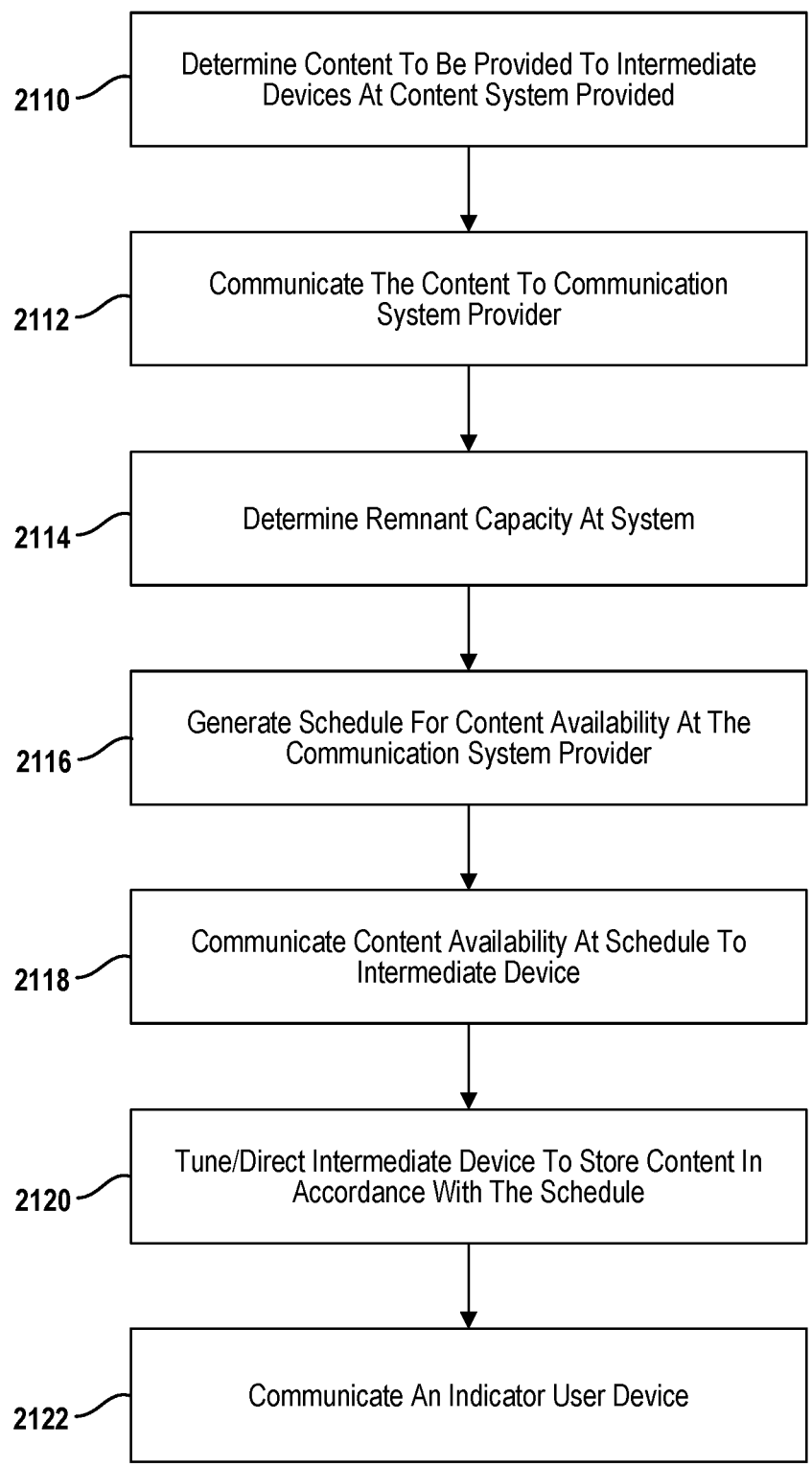
FIG. 21 is a flowchart of a method for scheduling content at an intermediate device.

Referring now to FIG. 21, details of communicating content to an intermediate device is set forth. In step 2110, content to be provided to the intermediate devices is determined at the content provider. The content provider may provide content based upon the element described above such as the popularity, the preferences, the demographics and the behavior of the various users at the intermediate device. Recommended or special content may also be selected.

In step 2112, the content is communicated to the content system provider. In step 2114, the determination whether remnant capacity is available is determined. In step 2116, a schedule for content availability at the communication system provider is generated. The schedule determines the time and the resource to be used for communicating the content. The time may be a common or universal time used throughout the system such as a GPS-based time system. The other resources used for communicating the content may depend upon the system and may specify the frequency, the code associated with the system and the transponder associated with the communication should a satellite system be used for communicating the content.

In step 2116, a schedule for content availability at the communication system provider is set forth. The schedule provides the content availability at the communication system provider. In a sense, the schedule provides a list of content and the time or times that the content will be communicated. As mentioned above, all of the content may not be communicated in one large file. That is, the content may be broken into chunks and the schedule for each of the chunks may be provided. In step 2118, the content availability schedule is communicated to the intermediate device. By communicating the times and the resources being used for the communication of content, the intermediate device may be easily tuned to the communication system for receiving the content. In step 2120, the intermediate device is tuned or otherwise directed to the content so that it may be stored in accordance with the schedule. The content is then made available to the individual users associated with the intermediate device. In step 2122, an indicator associated with content stored at the intermediate device is communicated to the user devices associated with the intermediate device. The indicator may be communicated directly or may be communicated in response to a query from the users.

Figure 22:
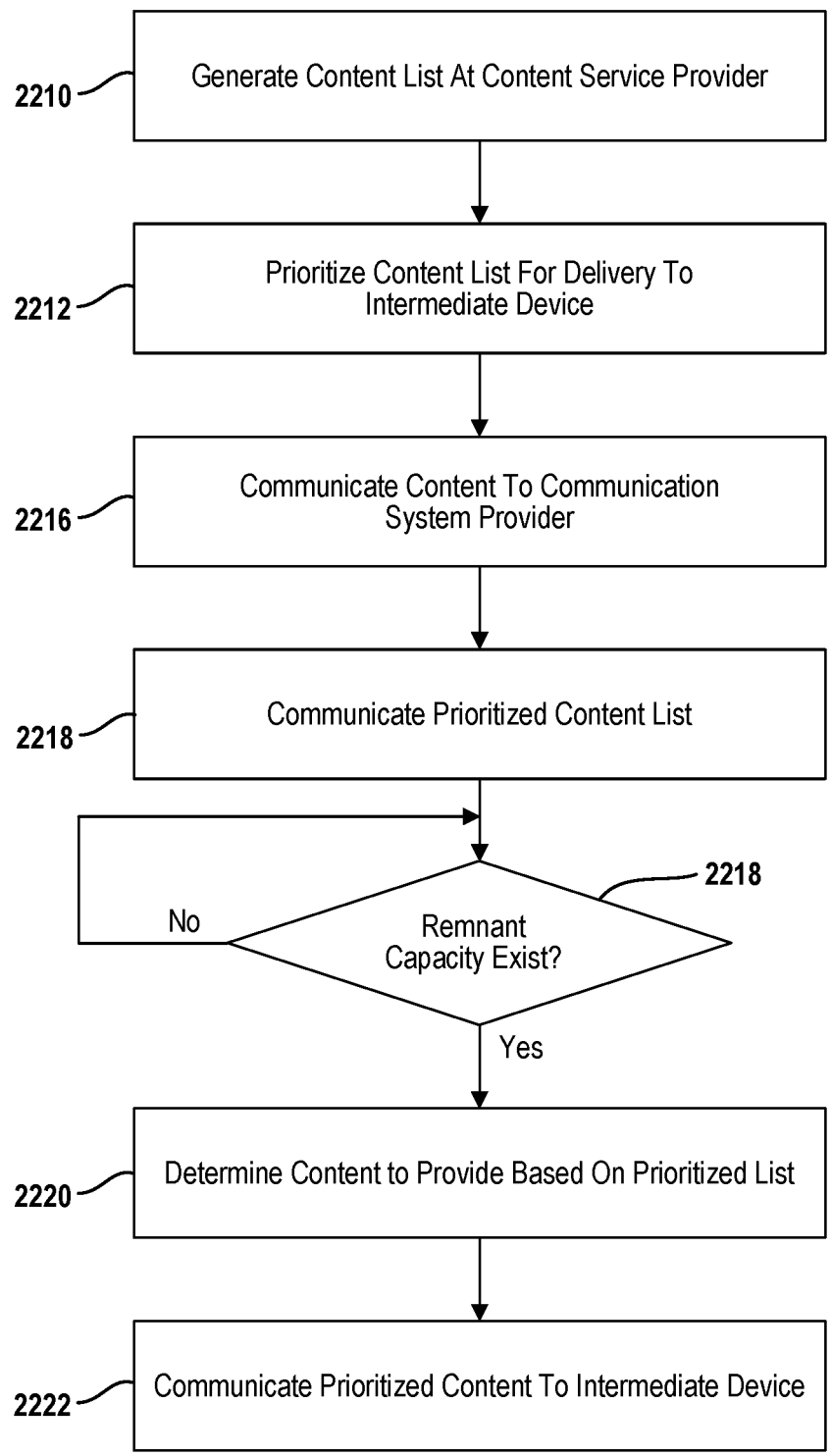
FIG. 22 is a flowchart of a method for prioritizing content for delivery through the remnant capacity delivery system.

Referring now to FIG. 22, the prioritization of content may also be performed when communicating the content to the intermediate device. In step 2210, a content list is generated at the content service provider. In step 2212, the content list may be prioritized for delivery to the intermediate devices. The content list may be prioritized according to various aspects such as popularity of the content, preferences, demographics, and behavioral actions of the users and the time relevance of the content. For example, weather content may be given a higher priority than movie content. In step 2214, the content is communicated to the communication system provider. A prioritized list may be communicated in step 2216. Both the list and the content itself may be communicated in response to query signals such as those set forth in FIG. 20. In step 2218, it is determined whether remnant capacity exists. If remnant capacity does not exist, the system is then checked for remnant capacity. If remnant capacity does exist in step 2218, step 2220 is performed. In step 2220, the content to be provided to the intermediate devices based upon the prioritized list is determined. In step 2222, the prioritized content is communicated to the intermediate device.

Figure 23:
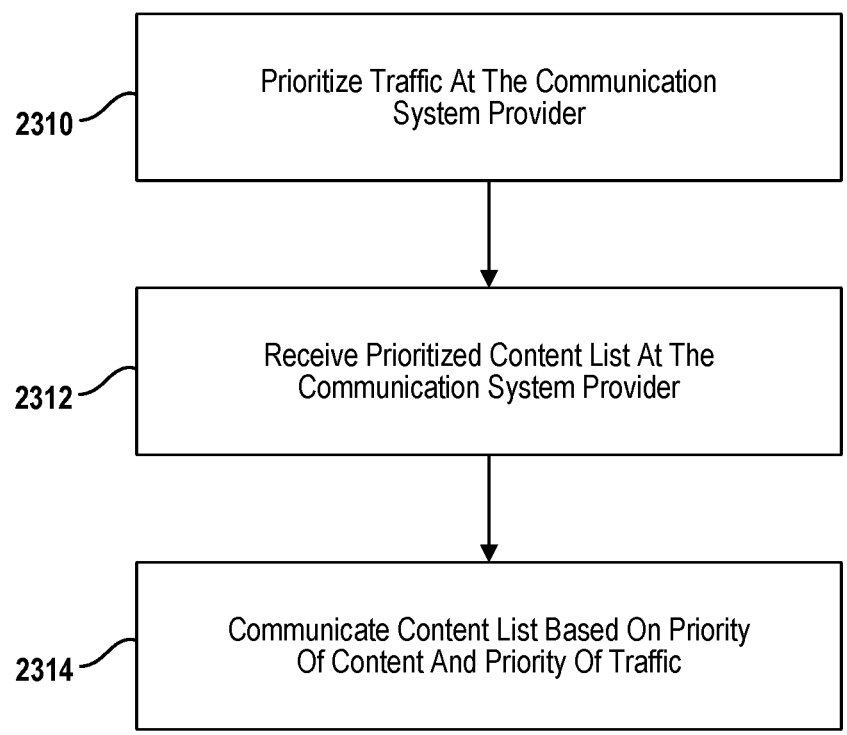
FIG. 23 is a flowchart for prioritizing the traffic through a communication system provider.

Referring now to FIG. 23, a method of prioritizing relative to the communication system traffic and priority is set forth. In step 2310, the traffic is prioritized at the communication system provider. That is, the communication system provider may provide various types of services and content including voice, data, notifications and the like. The different types of services and content may be assigned different levels of priority. As is described above, remnant capacity is capacity that is unused. However, capacity that is being underutilized may be used for communicating content. Thus, a priority may be assigned to communicate content above some of the lesser categories of content. Further, a content provider may pay for content to be prioritized and delivered on a priority basis. For example, a movie studio may pay more for delivery of a certain movie. In step 2312, a prioritized content list may be received at the communication system provider. The priority of the remnant capacity may be as described above. The remnant capacity may be lower than the primary capacity of the system. As mentioned above space within the storage of the intermediate device and certain remnant capacity may be made higher priority due to payment by a content provider.

Figure 24:
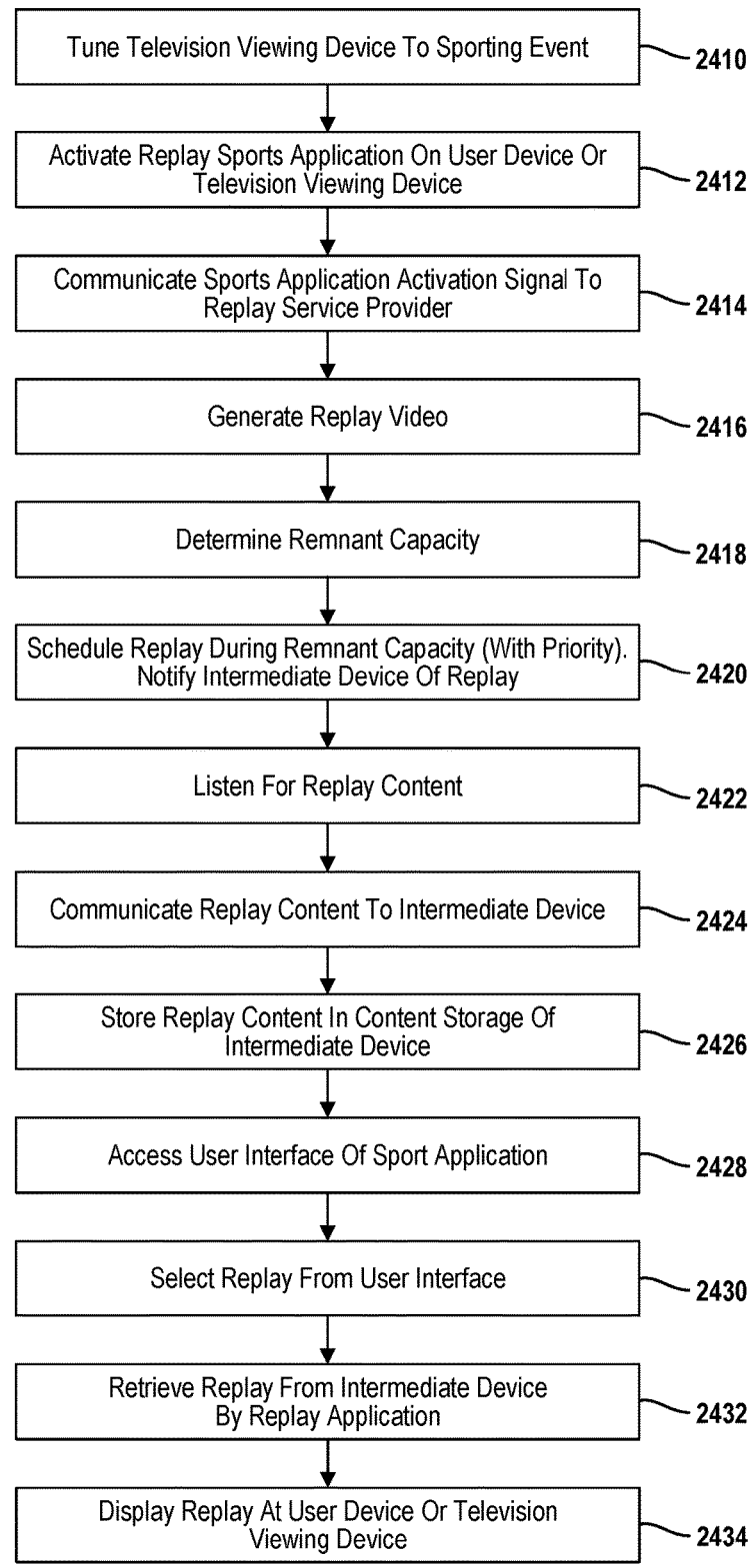
FIG. 24 is a flowchart for a method for providing sports replays.

Referring now to FIG. 24, a method of providing a sports replay is set forth. In step 2410, a television viewing device is tuned to a sporting event. The television viewing device may be a traditional television or one of a number types of devices that can receive television signals through the internet or other types of broadcast network. In step 2412, a sports replay application may be activated on the user device on the television viewing device. In step 2414, the activation signal is communicated to a service provider. The service provider may generate a replay video in step 2416. In step 2418, remnant capacity of the communication system is determined. In step 2420, a replay is scheduled during the remnant capacity. The replay content may be prioritized at a high level for delivery, especially if the replay is for a currently broadcasting event. The replay may be scheduled and an intermediate device may be notified as to the time the replay will be delivered. In step 2422, the intermediate device listens for the replay content to be communicated. In step 2424, the replay content is communicated to the intermediate device. In step 2426, the replay content is stored in the intermediate device.

In step 2428, a user interface of the sports application may be updated when replay content is stored within the intermediate device. The replay may be selected in the user interface in step 2430. In step 2432, the replay is retrieved from the intermediate device by the application at the user device or television. In step 2434, the replay is displayed at the user device or television viewing device.

Figure 25A:
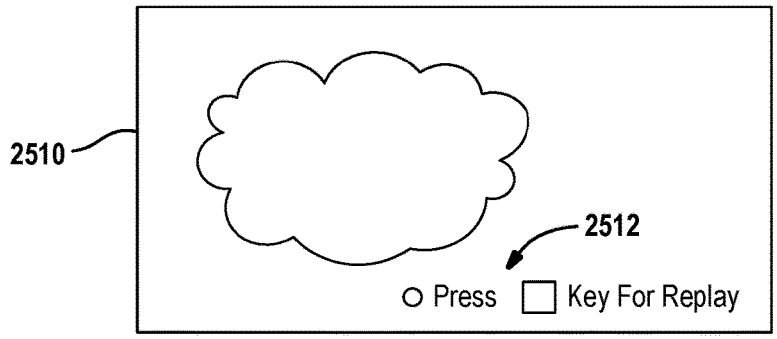
FIGS. 25A-25D are user interfaces for obtaining sports replays.

Referring now to FIG. 25A, screen displays for accessing replays are set forth. A screen display 2510 is used for selecting a replay. A certain key may be pressed for requesting a replay. The request for the replay may communicate through a wired or wireless network. Ultimately, the request is communicated to a content provider or replay clip provider to indicate that a replay is requested. The replay request may be communicated with a time code and program identifier so that the replay may be communicated to the intermediate device associated with the user device. The indicator 2512 instructs the user to select a particular key for replaying. Of course, should the device be a touchscreen device, a tap of the screen may be all that is required.

Figure 25B:
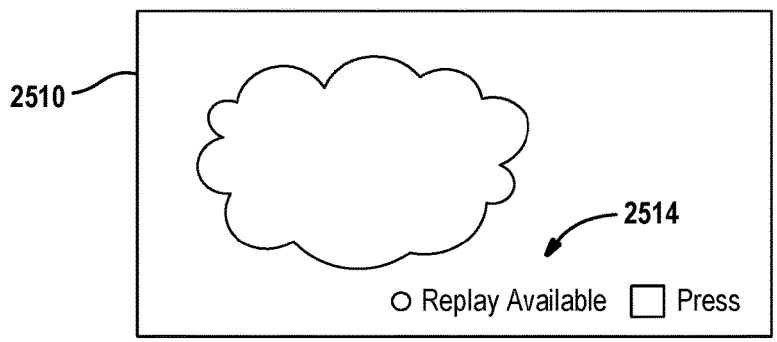

Referring now to FIG. 25B, a screen indicator 2514 may be generated on the screen display 2510. The screen display 2510 may continue to display a sporting event or other event. When a requested replay arrives at the intermediate device, the intermediate device may send a replay available signal to the user device that requested the replay. The indicator 2514 may instruct the user to select using a keyboard or the like for replaying the replay.

Figure 25C:
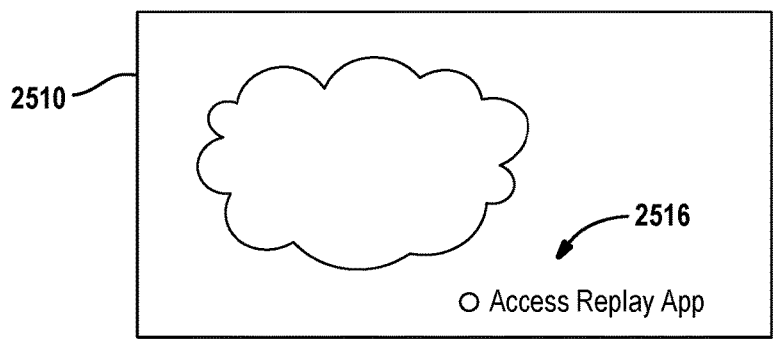

In screen display 2510 of FIG. 25C, the replay may not need to be requested by a particular person or user device. Typically, in a popular sporting event, various plays are important and a centralized location may develop the replays without user input. Thus, a replay app may be provided that may be accessed using various remote control keys or the like. An indicator 2516 may be used to instruct the user to access the app.

Figure 25D:
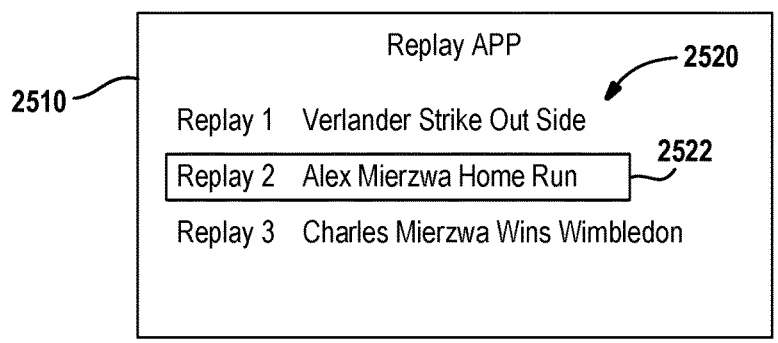

In FIG. 25D, the replay application or app may be accessed. The replay app may be accessed using the screen displays illustrated in either FIG. 25B or 25C or some other numerical or keypad combination associated with the user device. The replay app generates a list 2520 with various replays that are accessible by the intermediate device. A select box 2522 may be scrolled or moved with arrow keys on a remote control for selecting content for playback. Other numerical or alphanumerical characters may be entered into a remote control or keypad for playing back available replay content.

Figure 26:
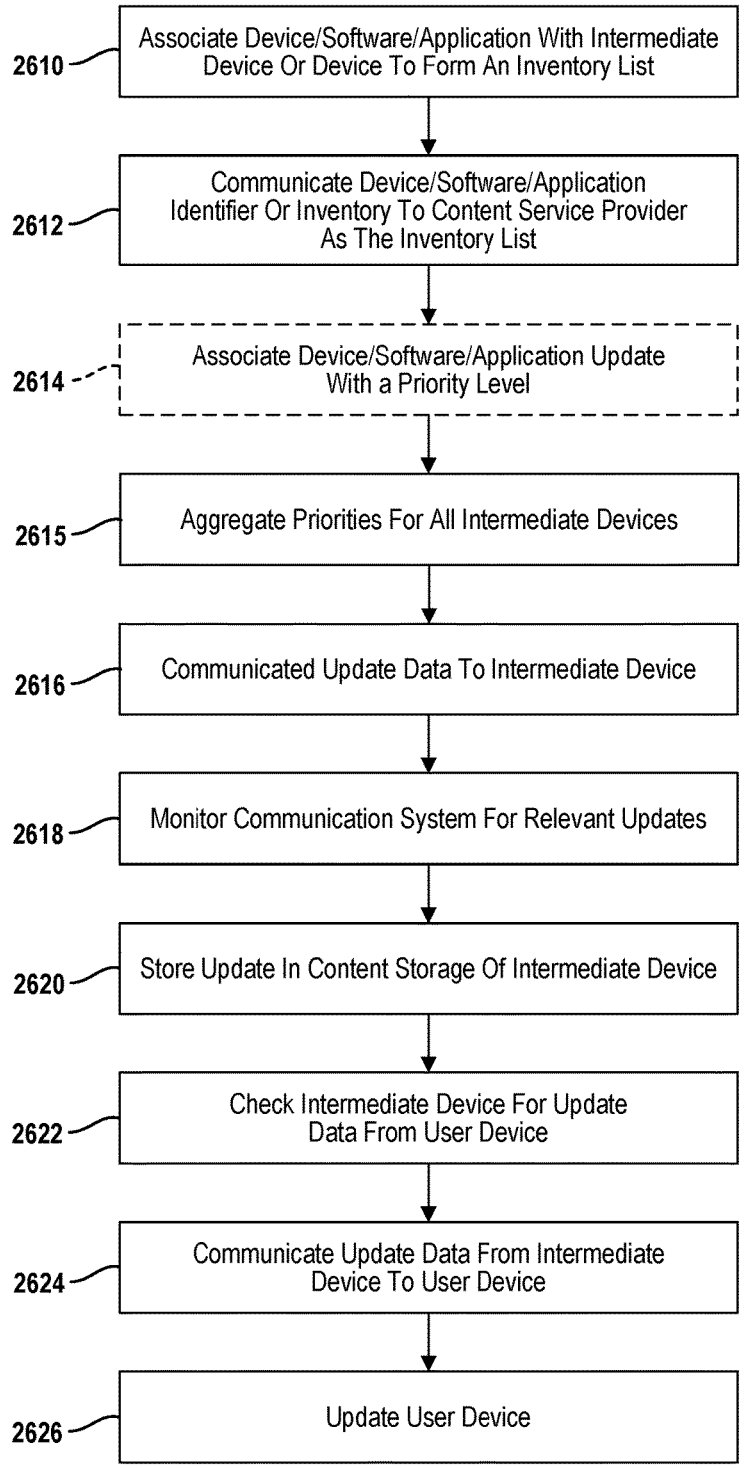
FIG. 26 is a flowchart of a method for providing software, device or application updates.

Referring now to FIG. 26, the remnant content delivery system may also be used for delivering device, software and application updates that are associated with the intermediate device or user devices associated with the intermediate device. In step 2610, the device, software and applications are associated with an intermediate device or device to form an inventory list. In step 2612, the inventory list may be communicated to the content service provider. The inventory list may also include device identifiers, software identifiers and application identifiers. The inventory list may also list the devices associated with the various software and applications. Although, this is not a necessary step. In step 2614, an optional step of associating the device, software and application updates with a priority level is set forth. The priority level may prioritize either high or low priorities for the software, device and application updates. Critical security updates may, for example, be given a higher priority. In step 2615, the content provider or the communication network may synthesize all the content and software requirements for each intermediate device, including re-transmission or missing content requirements, and priority-based software and update requirement. The system may then weigh the individual requirements against what content is better to be transmitted and how to communicate it (unicast vs. broadcast), and adjust the timing. The prioritization or delivery method determination may also be based on the number of intermediate devices that require the content. A master queue of content scheduled to be broadcasted may then be developed. The content may be broadcasted in parallel to updating the intermediate devices about the type of content that is being scheduled to be broadcasted. In step 2616, the update data is communicated to the intermediate devices. In step 2618, the broadcasts from the communication system are monitored for relevant updates. That is, the intermediate device may monitor the broadcast. When the broadcast corresponds to device updates, software updates or application updates on the inventory list may be stored within the intermediate device in step 2620. In step 2622, the user device may obtain a notification or may check the intermediate device for available updates by comparing the list to what is available. In step 2624, the update data is communicated from the intermediate device to the user device. In step 2626, the user device is updated with the new software, software revision or application. During the update, a notice signal to the system regarding the update being successfully executed or implemented may be communicated to the intermediate device or content system provider to prevent further attempts to communicate the same data (update the inventory) and to provide a basis for obtaining the next revision from the communication system.

Figure 27A:
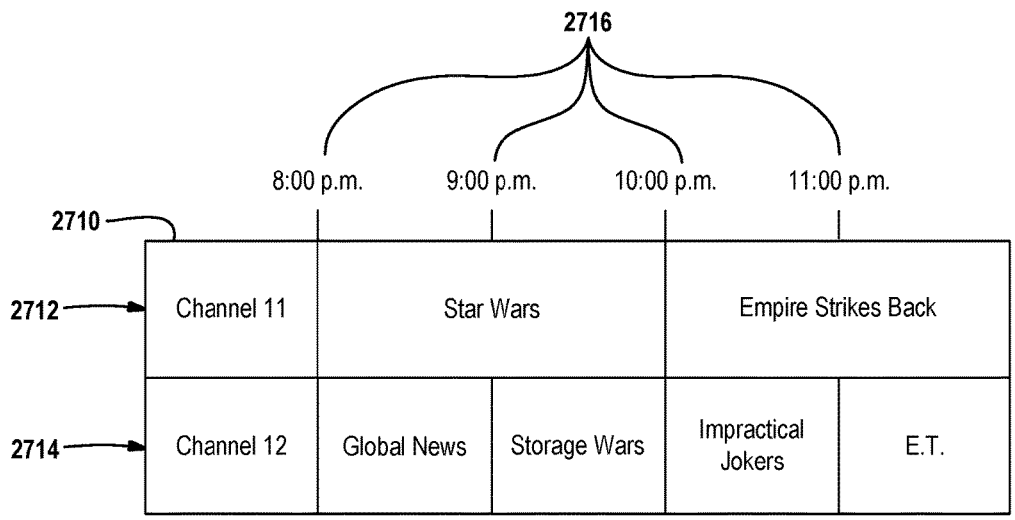
FIG. 27A is a first representation of a channel guide implemented as a grid guide generated at the intermediate device using content available at the intermediate device.

Referring now to FIG. 27A, a screen display for a grid guide 2710 is set forth. The grid guide 2710 illustrates a first virtual channel 2712 and a second virtual channel 2714. The first virtual channel 2712 is associated with the first content provider 212A and the second virtual channel 2714 is associated with the second content provider 212B. The first content provider 212A and the second content provider 212B may communicate metadata with the content to control the arrangement in a virtual channel guide. The channel/content provider, the channel display, screen display name and time may be communicated in the metadata. Although two virtual channels are illustrated, various numbers of virtual channels may be set forth. The guide 2710 includes time indicators 2716 that are provided on a regular basis. In this example, every hour has a time indicator 2716. In this example, the content titles for content stored within the intermediate device are formed into two channels. The channels may be named in the channel column 2718. In this example, "Channel 1" and "Channel 2" are set forth.

Figure 27B:
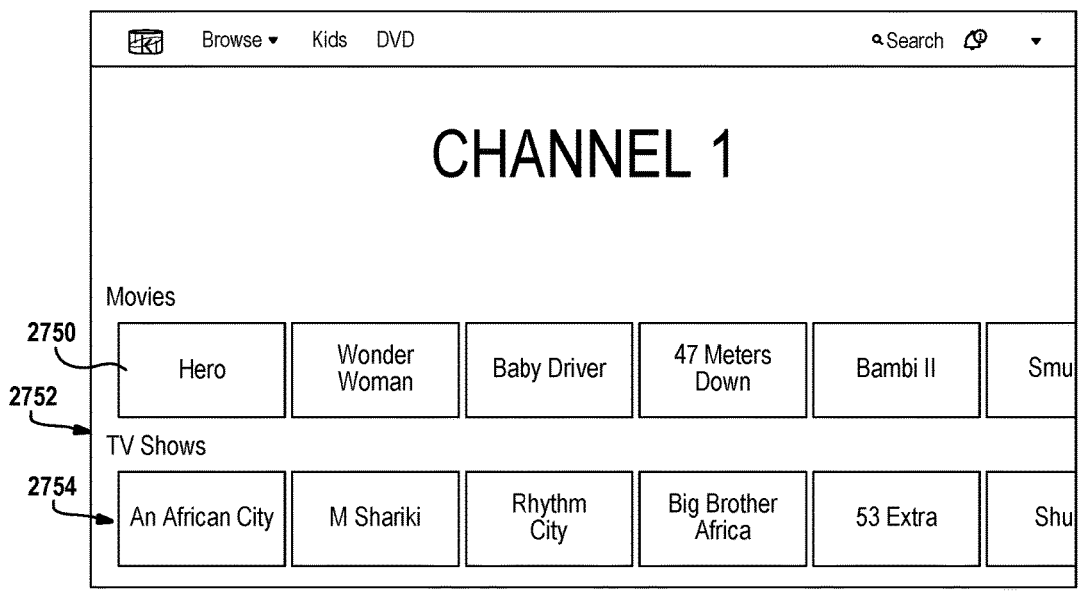
FIG. 27B is a second representation of a channel guide implemented as a poster display generated at the intermediate device using content available at the intermediate device.

Referring now to FIG. 27B, a virtual channel associated with a first content provider is set forth. In this example, a plurality of indicators, identifiers or posters 2750 are arranged in row. A "Movies" row 2752 and a "TV show" row 2754 are arranged to show television show indicators and movie indicators that are stored in the intermediate device that are associated with Channel 1 which corresponds to the first content provider 212A. More than one channel may be associated with the content provider 212A, 212B. Each channel may be displayed separately. Metadata provided with the content may include channel and content provider indicators. By displaying the content stored within the intermediate device, users are directed to lower cost content with high customer satisfaction because the content is immediately available.

Figure 28:
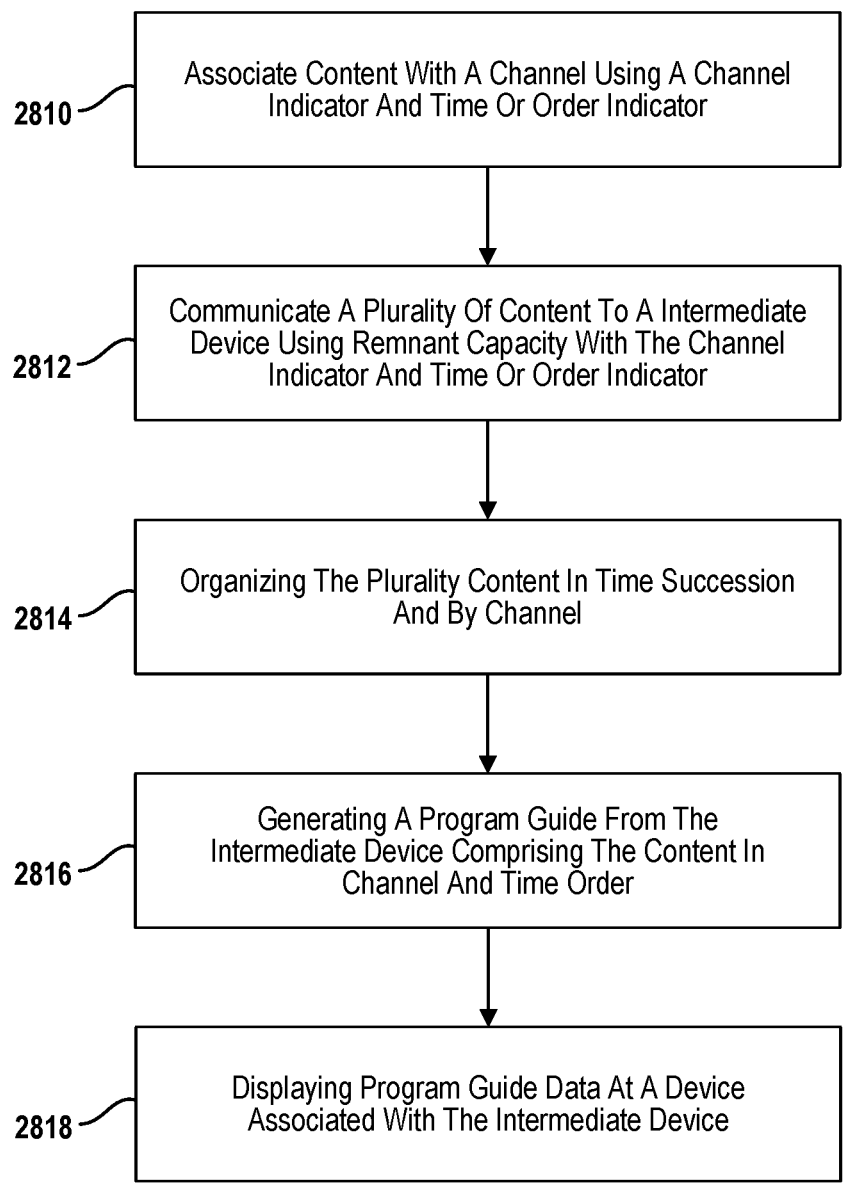
FIG. 28 is a flowchart of a method for generating a channel.

Referring now to FIG. 28, a method for forming channel guide 2710 is set forth. In step 2810, a channel is associated with a content using a channel indicator and/or time or order indicator. These steps may be performed in the intermediate device at the library guide/channel module 874 illustrated in FIG. 8B. The association with a channel may be formed into the metadata for each piece of content as a channel identifier.

In step 2812, a plurality of content is communicated to the intermediate device using remnant capacity with the channel indicator and time order indicator provided within the metadata. In step 2814, the plurality of content is organized in timed succession and channel according to the metadata associated therewith.

In step 2816, a program guide is generated from the intermediate device that comprises the content in channel and time order. In step 2818, the program guide is displayed at the device associated with the intermediate device. In this manner, all or most of the content provided in the channel may be indicated in the program guide. In this manner, having a plurality of content to choose from will allow the user to access the content more rapidly.

Figure 29:
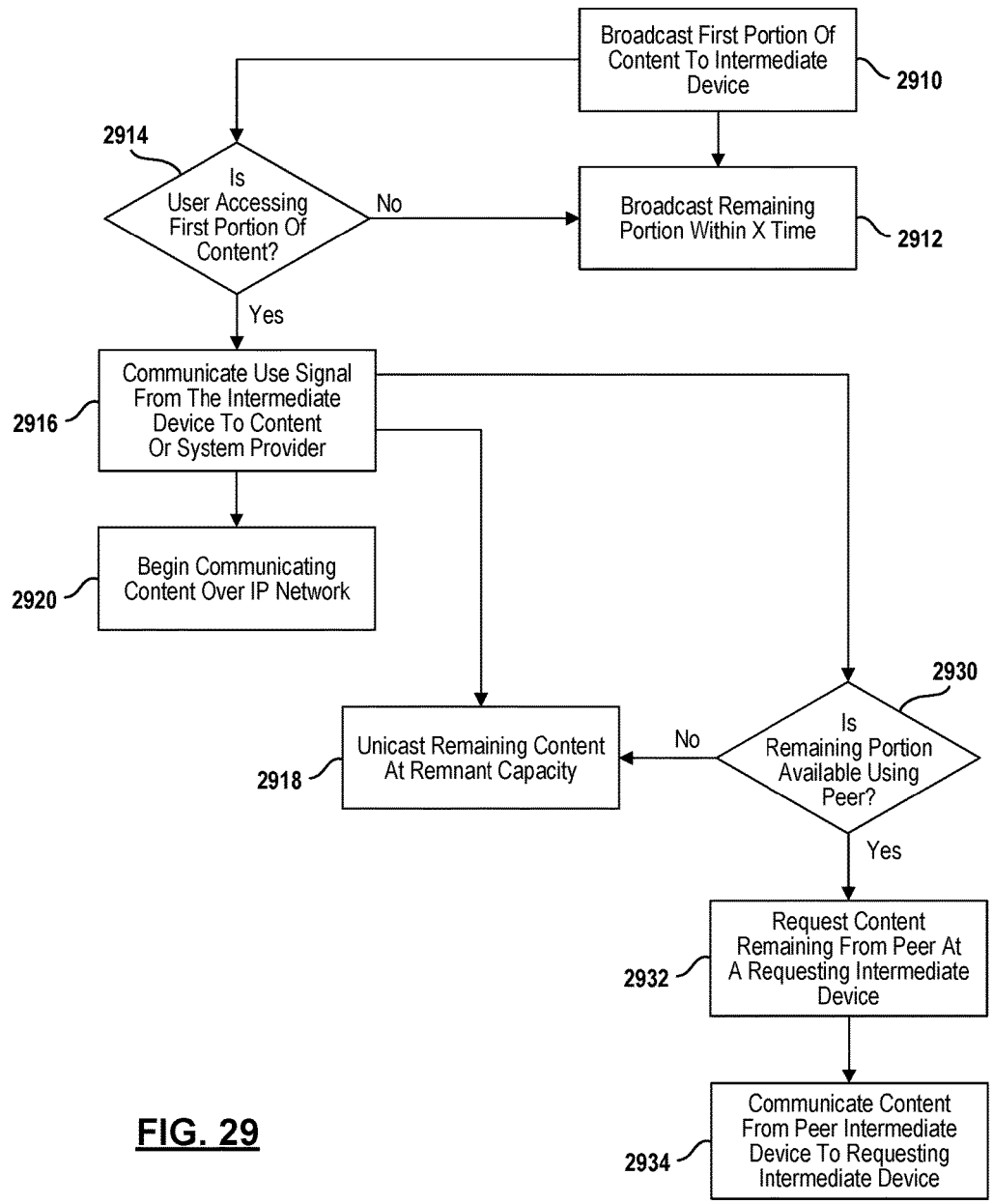
FIG. 29 is a flowchart of a method for broadcasting only a portion of the content and following up with broadcasting the rest of the content.

Referring now to FIG. 29, a method for communicating content where initially only a portion is communicated to the intermediate device is set forth. In step 2910, a first portion of the content is communicated using the remnant capacity system as described above. The remnant capacity may be used to broadcast a first portion. In step 2912, the remaining portion of the content is may be unicasted or broadcasted within a predetermined time. The predetermined time "X" may be determined based upon a statistical likelihood that the content will be viewed.

In an alternative, after a first portion of content is communicated to the intermediate device in step 2910, step 2912 may determine whether the user is accessing the content. If the content is not being accessed, the system may ultimately broadcast the remaining portion as in step 2912 or may terminate and not broadcast any of the remaining portions in step 2912.

In step 2914, if the user is accessing a first portion of the content, step 2916 communicates a use signal from the intermediate device to a content or system provider. After step 2916, two alternative choices may be formed depending on the system requirements. In step 2918, the remaining content may be unicast using remnant capacity. This is useful if the content is a large piece of content and it is likely that the remnant capacity could fulfill the remaining portion before the end of the content is watched. For example, the first 20% of a movie may be broadcasted using remnant capacity. When the user begins viewing the content, the signal is generated in step 2916 and the remaining portion of the signal may be unicasted using remnant capacity. Broadcasting of the missing content may also be performed.

In the alternative, after step 2916 and a use signal is communicated from the intermediate device to either the content or system provider, the remaining content may be communicated over an IP network in step 2920. Presumably, this may happen when a slow internet connection is used by the user.

The additional content may also be obtained from a peer intermediate device. That is, after use is detected, it is determined whether or not a peer intermediate device has the remaining content. In step 2930, it is determined whether a peer intermediate device in the local area network or adjacent local area networks has the content. In step 2932, the content is requested from a peer intermediate device by a requesting intermediate device. If the content is not available from a peer intermediate device, the content may be transmitted from the communication system or through an IP network. In step 2934, content is communicated from the peer intermediate device to the requesting intermediate device.

Various business cases uses may be implemented with the examples above including a cell or mobile device provider communicating content to devices on as a pay service or some type of bonus service.

As mentioned above various priorities may be assigned to the content. Content provided from a first content provider may have a priority over content from a second content provider. Higher priority may be paid for by a content provider. The carousel repletion rate or basic bit stream rate may be increased and decrease according to value. Further, the amount of storage space may be allocated to different content providers on a per amount basis. More amounts may be paid for by the content provider.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A method comprising:
   communicating first data to cellular users for real time consumption by the cellular users using a first portion of an overall system capacity of a terrestrial cellular communication system during a first time, said overall system capacity comprising the first portion and remnant capacity separate from the first portion, wherein said real time consumption occurring at a same time as when a user requests to consume said first data;
   communicating second data through the terrestrial cellular communication system to a first device comprising an intermediate data storage device using the remnant capacity of the overall system capacity during the first time, said second data for non-real time consumption with a user application; and
   performing non-real time consumption of the second data with the user application by:
      after communicating second data, storing the second data in the intermediate data storage device of the first device;
      after storing the second data, requesting second data, by the user application, from the intermediate data storage device, at a second time that is different than the first time of real time consumption;
      communicating the second data from the intermediate data storage device of the first device to the user application after storing the second data; and
      in real time, receiving the second data from the intermediate storage device and consuming the second data at the user application.

2. The method of claim 1 wherein communicating second data to the intermediate data storage device comprises communicating second data to the intermediate data storage device through the terrestrial cellular communication system and a satellite system.

3. The method of claim 1 wherein communicating second data to the intermediate data storage device comprises communicating second data to the intermediate data storage device through the terrestrial cellular communication system and a non-geostationary orbit satellite system.

4. The method of claim 1 wherein communicating second data to the intermediate data storage device comprises communicating second data to the intermediate data storage device through the terrestrial cellular communication system and a non-geostationary orbit satellite system with a geosynchronous period.

5. The method of claim 4 further comprising tracking the non-geostationary orbit satellite system using a tracking terminal.

6. The method of claim 1 wherein communicating second data to the first device comprises communicating second data using a first carousel and a second carousel, said first carousel have a first repetition rate less that a second repetition rate of the second carousel.

7. The method of claim 6 wherein communicating second data to the first device comprises communicating second data to the first device from the first carousel and the second carousel through different paths.

8. The method of claim 7 wherein the different paths comprises a first transponder and a second transponder of a satellite.

9. The method of claim 1 wherein communicating second data to the first device comprises communicating second data through a two-way unicast, push unicast or broadcast mode of the terrestrial cellular communication system.

10. The method of claim 1 wherein communicating second data to the first device comprises communicating second data through a long term evolution broadcast mode of the terrestrial cellular communication system.

11. The method of claim 1 wherein communicating second data to the first device comprises communicating second data through the terrestrial cellular communication system and a digital television system.

12. The method of claim 1 wherein communicating second data through the terrestrial cellular communication system comprises communicating second data from the terrestrial cellular communication system in a prioritized manner by prioritizing a sequence of delivery according to an importance of the second data, an amount of users consuming the second data, an available capacity, and performance characteristics of the terrestrial cellular communication system.

13. The method of claim 1 wherein communicating second data through the terrestrial cellular communication system comprises communicating at least one of video content, software updates and sports replay content.

14. The method of claim 1 wherein communicating second data through the terrestrial communication system comprises communicating by broadcasting.

15. The method of claim 1 wherein storing the second data in the intermediate data storage device comprises storing content in a solid state device.

16. The method of claim 1 wherein storing the second data in the intermediate data storage device comprises storing second data in a hard disk drive.

17. The method of claim 1 wherein the user application is located in the first device.

18. The method of claim 1 wherein communicating second data using remnant capacity comprises communicating data using an unused or under-used resource.

19. The method of claim 18 wherein communicating second data using an unused resource or under-used resource comprises prioritizing real time first data to user devices over communication of non-real time second data to the intermediate data storage device.

20. The method of claim 1 wherein the first device or the intermediate data storage device is disposed at a cell tower, and wherein communicating second data from the intermediate data storage device of the first device to the user application comprises communicating data through a wireless network originating at the cell tower.

21. The method of claim 1 wherein communicating second data from the intermediate data storage device to the user application comprises communicating data through a local area network or a direct wired connection.

22. The method of claim 1 further communicating second data from the intermediate data storage device and a second intermediate data storage device of a second device.

23. The method of claim 1 further comprising, after requesting requested data from the user application, determining whether the requested data is stored in the intermediate data storage device of the first device, and when the requested data is stored in the intermediate data storage device communicating the requested data therefrom when the requested data is not stored in the intermediate data storage device requesting data through the terrestrial cellular communication system.

24. The method of claim 1 further comprising generating a channel guide comprising content titles of data stored at the intermediate data storage device and displaying, at a display associated with the user application of a user device, the channel guide and the content titles associated with a virtual channel.

25. A system comprising:
a first device comprising intermediate data storage device;
a user application in communication with the intermediate data storage device; and
a terrestrial cellular communication system communicating first data in real time to cellular users for real time consumption by the cellular users using a first portion of an overall system capacity during a first time, said overall system capacity comprising the first portion and remnant capacity separate from the first portion, wherein said real time consumption occurring at a same time as when a user requests to consume said first data, said terrestrial cellular communication system communicating second data to the first device using remnant capacity of the overall system capacity during the first time, said second data for non-real time consumption with the user application;
said user application performing non-real time consumption of the second data by:
said intermediate data storage device storing the second data in the intermediate data storage device of the first device after the terrestrial cellular communication system provide communicates the second data;
said user application requesting second data from the intermediate data storage device after the second data is stored in the intermediate device and at a second time that is different than the first time of real time consumption;
said intermediate data storage device communicating second data stored therein to the user application; and
said user application receiving the second data from the intermediate device and consuming the second data in real time.

26. The system of claim 25 wherein a terrestrial cellular communication system provider communicates second data to the intermediate data storage device through the terrestrial cellular communication system and a satellite system.

27. The system of claim 26 wherein the satellite system comprises a non-geostationary orbit satellite system.

28. The system of claim 26 wherein the satellite system comprises a non-geostationary orbit satellite system with a geosynchronous period.

29. The system of claim 26 wherein the intermediate data storage device is coupled to a satellite tracking terminal.

30. The system of claim 25 wherein the terrestrial cellular communication system further comprises a first carousel and a second carousel, said first carousel have a first repetition rate less that a second repetition rate of the second carousel.

31. The system of claim 30 wherein the second data is communicated from the first carousel and the second carousel through different paths.

32. The system of claim 31 wherein the different paths comprises a first transponder and a second transponder of a satellite.

33. The system of claim 25 wherein a terrestrial cellular communication system provider communicates second data to intermediate data storage device through a two-way unicast, push unicast or broadcast mode of the terrestrial cellular communication system.

34. The system of claim 25 wherein a terrestrial cellular communication system provider communicates data to intermediate data storage device through a long term evolution broadcast mode of the terrestrial cellular communication system.

35. The system of claim 25 wherein a terrestrial cellular communication system provider communicates second data to intermediate data storage device through the terrestrial cellular communication system and a digital television system.

36. The system of claim 25 wherein the terrestrial cellular communication system communicates second data in a prioritized manner by prioritizing a sequence of delivery according to an importance of the second data, an amount of users consuming the second data, an available capacity, and performance characteristics of the terrestrial cellular communication system.

37. The system of claim 25 wherein the second data comprises at least one of video content, software updates and sports replay content.

38. The system of claim 25 wherein the terrestrial cellular communication system communicates data by broadcasting.

39. The system of claim 25 wherein the intermediate data storage device comprises a solid state device or a hard disk drive.

40. The system of claim 25 wherein the user application is located in the first device.

41. The system of claim 25 wherein the remnant capacity comprises an unused resource.

42. The system of claim 25 wherein the remnant capacity comprises an under-used resource.

43. The system of claim 25 wherein the intermediate data storage device is disposed at a cell tower, said cell tower forming a wireless network, and wherein the intermediate data storage device communicates the second data to the user application through the wireless network originating at the cell tower.

44. The system of claim 25 wherein the intermediate data storage device communicates the second data from the intermediate data storage device through a local area network or a direct wired connection.

45. The system of claim 25 wherein the intermediate data storage device communicates the second data from the intermediate data storage device through a direct connection to a user device.

46. The system of claim 25 wherein the intermediate data storage device redirects the user application to request requested data through the terrestrial cellular communication system when the requested data is not stored in the intermediate data storage device.

47. The system of claim 25 wherein the intermediate data storage device generates a channel guide with content titles of the second data stored at the intermediate data storage device associated with a channel provider and communicates the channel guide to the user application and displaying the content titles associated with a virtual channel.

48. The method of claim 1 wherein communicating data from the intermediate data storage device comprises:
communicating second data to a router of a local area network using the terrestrial cellular communication system in real-time at a first speed; and
communicating the second data from the router to the user application of a user device through the local area network.

49. The method of claim 48 further comprising communicating second data to the terrestrial cellular communication system operated by a non-cellular content provider and wherein the terrestrial cellular communication system is operated by a second content provider different than the non-cellular content provider.

* * * * *